(12) United States Patent
Ji et al.

(10) Patent No.: US 12,132,596 B2
(45) Date of Patent: Oct. 29, 2024

(54) METHOD AND DEVICE FOR ALLOCATING RESOURCE IN WIRELESS COMMUNICATION SYSTEM

(71) Applicant: Samsung Electronics Co., Ltd., Gyeonggi-do (KR)

(72) Inventors: Hyoungju Ji, Gyeonggi-do (KR); Taehyoung Kim, Gyeonggi-do (KR); Heecheol Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 424 days.

(21) Appl. No.: 17/440,029

(22) PCT Filed: Mar. 6, 2020

(86) PCT No.: PCT/KR2020/003172
§ 371 (c)(1),
(2) Date: Sep. 16, 2021

(87) PCT Pub. No.: WO2020/189933
PCT Pub. Date: Sep. 24, 2020

(65) Prior Publication Data
US 2022/0173951 A1 Jun. 2, 2022

(30) Foreign Application Priority Data
Mar. 19, 2019 (KR) .................. 10-2019-0031052

(51) Int. Cl.
*H04L 5/00* (2006.01)
*H04L 27/26* (2006.01)
(Continued)

(52) U.S. Cl.
CPC ........ *H04L 27/2636* (2013.01); *H04L 5/0007* (2013.01); *H04W 72/044* (2013.01); *H04W 72/23* (2023.01)

(58) Field of Classification Search
CPC .. H04L 5/007; H04L 27/3636; H04W 72/044; H04W 72/23
See application file for complete search history.

(56) References Cited

U.S. PATENT DOCUMENTS 8,340,676 B2 * 12/2012 Nory .................... H04W 72/23
370/208
9,344,119 B2   5/2016 Kim et al.
(Continued)

FOREIGN PATENT DOCUMENTS

| KR | 10-2018-0018301 | 6/2017 |
| KR | 10-1863928 | 6/2019 |
| WO | WO 2016/209156 | 12/2016 |

OTHER PUBLICATIONS

PCT/ISA/210 Search Report issued on PCT/KR2020/003172, Jun. 15, 2020, pp. 7.
(Continued)

*Primary Examiner* — Alpus Hsu
(74) *Attorney, Agent, or Firm* — The Farrell Law Firm, P.C.

(57) ABSTRACT

The present disclosure relates to a communication technique for combining IoT technology and a 5G communication system for supporting a higher data transmission rate than a 4G system, and a system therefor. The present disclosure may be applied to intelligent services (e.g., smart home, smart building, smart city, smart car or connected car, healthcare, digital education, retail, security- and safety-related services, etc.) on the basis of 5G communication technology and IoT-related technology. According to an embodiment of the present disclosure, a method by a base station in a wireless communication system comprises the steps of: transmitting, to a terminal, downlink control information comprising resource allocation information for a virtual domain and resource allocation information for a
(Continued)

physical downlink shared channel (PDSCH); multiplexing the PDSCH in a virtual domain resource on the basis of the resource allocation information for the virtual domain; and performing discrete fourier transform (DFT) precoding for the multiplexed PDSCH.

15 Claims, 11 Drawing Sheets

(51) Int. Cl.
    *H04W 72/04*     (2023.01)
    *H04W 72/044*     (2023.01)
    *H04W 72/23*     (2023.01)

(56) References Cited

U.S. PATENT DOCUMENTS

| | | | | |
|---|---|---|---|---|
| 9,345,021 | B2* | 5/2016 | Nory | H04W 72/23 |
| 10,193,734 | B2* | 1/2019 | Shin | H04L 27/2675 |
| 10,277,270 | B2* | 4/2019 | Hwang | H04L 5/0016 |
| 10,516,560 | B2 | 12/2019 | Blasco et al. | |
| 10,848,356 | B2* | 11/2020 | Hwang | H04L 1/0061 |
| 10,880,847 | B2 | 12/2020 | Kwak et al. | |
| 2012/0014330 | A1 | 1/2012 | Damnjanovic et al. | |
| 2017/0366377 | A1 | 12/2017 | Papasakellariou | |
| 2018/0092100 | A1 | 3/2018 | Morioka et al. | |

OTHER PUBLICATIONS

PCT/ISA/237 Written Opinion issued on PCT/KR2020/003172, Jun. 15, 2020, pp. 7.
Panasonic, "Design Target and Initial Evaluation Results on Waveform for NR", R1-164875, 3GPP TSG RAN WG1 Meeting #85, May 23-27, 2016, 8 pages.
3GPP TS 38.212 V 15.2.0, 3GPP, 3rd Generation Partnership Project; Technical Specification Group Radio Access Network; NR; Multiplexing and Channel Coding (Release 15), Jun. 2018, 99 pages.
Korean Office Action dated May 29, 2024 issued in counterpart application No. 10-2019-0031052, 10 pages.

* cited by examiner

METHOD AND DEVICE FOR ALLOCATING RESOURCE IN WIRELESS COMMUNICATION SYSTEM

PRIORITY

This application is a National Phase Entry of PCT International Application No. PCT/KR2020/003172, which was filed on Mar. 6, 2020, and claims priority to Korean Patent Application No. 10-2019-0031052, which was filed on Mar. 19, 2019, the content of each of which is incorporated herein by reference.

TECHNICAL FIELD

The disclosure relates to a method and device for allocating resources in a wireless communication system.

BACKGROUND ART

In order to satisfy increases in demand for wireless data traffic now that a 4G communication system is commercially available, efforts are being made to develop an enhanced 5G communication system or a pre-5G communication system. For this reason, a 5G communication system or a pre-5G communication system is referred to as a beyond 4G network communication system or a post LTE system. In order to achieve a high data transmission rate, consideration is being given to implementing the 5G communication system in a mmWave band (e.g., 70 GHz band). In order to mitigate any route loss of electronic waves in a mmWave band and to increase transmission distances of electronic waves, the technologies of beamforming, massive multiple input and output (MIMO), full dimensional MIMO (FD-MIMO), array antenna, analog beamforming, and large scale antenna have been discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation have been developed. In addition, hybrid FSK and QAM modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, have been developed for the 5G system.

Innovation of the Internet from a human centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M) communication, and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network have been undertaken. For example, technologies such as a sensor network, machine to machine (M2M) communication, and machine type communication (MTC) have been implemented by the technique of beamforming, MIMO, and array antenna, which are 5G communication technology. Application of a cloud RAN as the foregoing big data processing technology may be an example of fusion of 5G technology and IoT technology.

As described above and with the development of a wireless communication system, various services can be provided; thus, a method for smoothly providing these services is required.

DISCLOSURE OF INVENTION

Technical Problem

According to an embodiment disclosed in the disclosure, a method and device for allocating resources in a wireless communication system can be provided.

Solution to Problem

According to an embodiment of the disclosure, a base station includes a transceiver; and a controller configured to transmit downlink control information including resource allocation information on a physical downlink shared channel (PDSCH) and resource allocation information on a virtual domain to a terminal, and to multiplex the PDSCH in a virtual domain resource based on resource allocation information on the virtual domain, and to perform discrete Fourier transform (DFT) precoding on the multiplexed PDSCH.

According to an embodiment of the disclosure, a method of a base station includes transmitting downlink control information including resource allocation information on a physical downlink shared channel (PDSCH) and resource allocation information on a virtual domain to a terminal; multiplexing the PDSCH in a virtual domain resource based on resource allocation information on the virtual domain; and performing discrete Fourier transform (DFT) precoding on the multiplexed PDSCH.

According to an embodiment of the disclosure, a terminal includes a transceiver; and a controller configured to receive downlink control information including resource allocation information on a physical downlink shared channel (PDSCH) and resource allocation information on a virtual domain from a base station, to identify virtual domain resources based on the resource allocation information on the virtual domain, and to receive a physical downlink shared channel (PDSCH) multiplexed in the virtual domain resource.

According to an embodiment of the disclosure, a method of a terminal includes receiving, from a base station, downlink control information including resource allocation information on a physical downlink shared channel (PDSCH) and resource allocation information on a virtual domain; identifying a virtual domain resource based on resource allocation information on the virtual domain; and receiving a physical downlink shared channel (PDSCH) multiplexed in the virtual domain resource.

Advantageous Effects of Invention

Through a resource allocation method proposed in the disclosure, data transmission and reception based on DFT-S-OFDM can be effectively performed.

MODE FOR THE INVENTION

Figure 1:
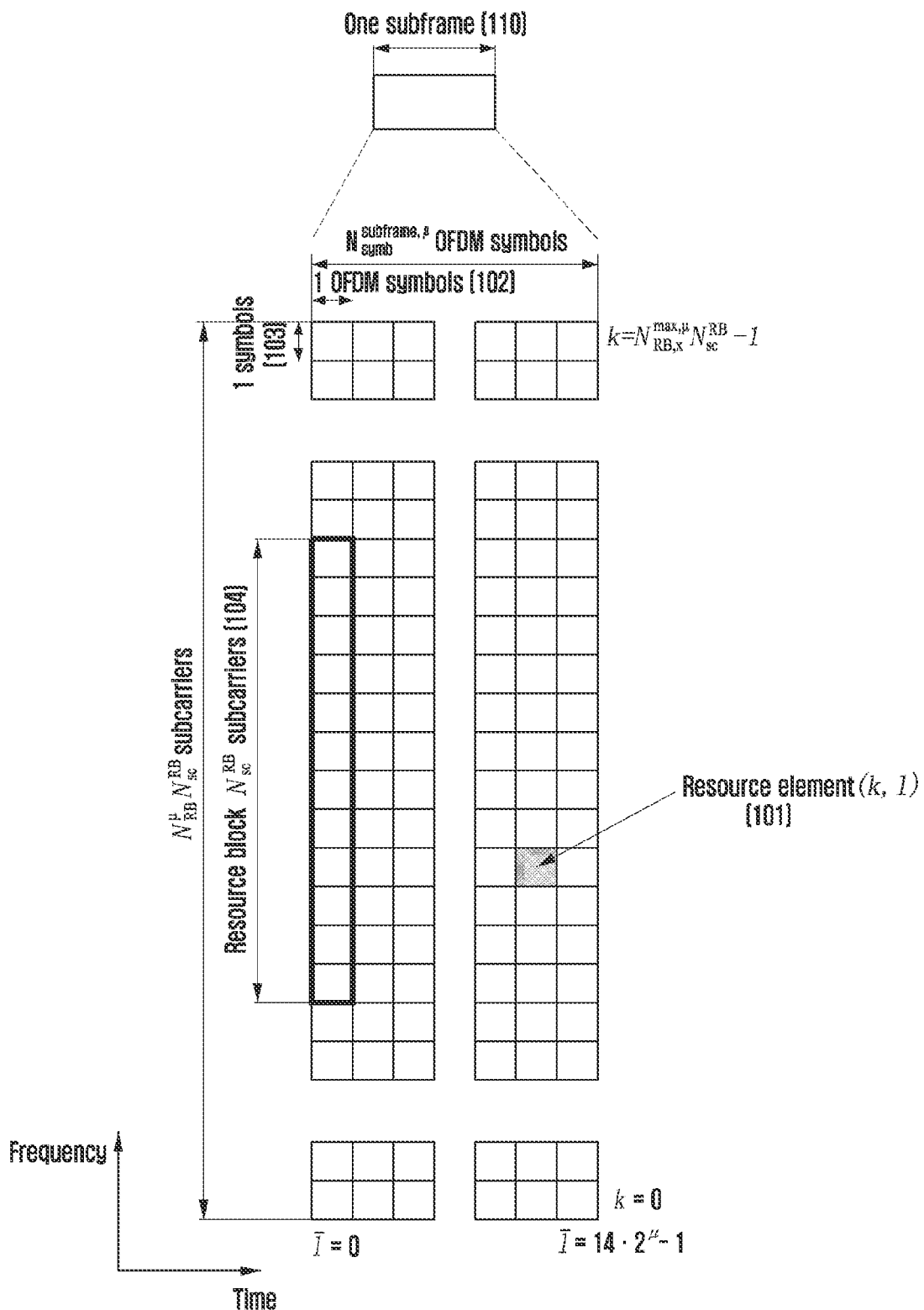
FIG. 1 is a diagram illustrating a basic structure of a time-frequency domain in a 5G communication system.

A wireless communication system has evolved from an initial voice-oriented service to a broadband wireless communication system that provides a high-speed and high-quality packet data service as in communication standard such as high speed packet access (HSPA), long term evolution (LTE), or evolved universal terrestrial radio access (E-UTRA), LTE-Advanced (LTE-A), and LTE-Pro of 3GPP, high rate packet data (HRPD), ultra mobile broadband (UMB) of 3GPP2, and 802.16e of IEEE.

As a representative example of the broadband wireless communication system, the LTE system employs an orthogonal frequency division multiplexing (OFDM) scheme in downlink (DL), and single carrier frequency division multiple access scheme in uplink (UL). The UL refers to a radio link in which a user equipment (UE) or a mobile station (MS)) transmits data or control signals to a base station (eNode B or base station (BS)), and the DL refers to a wireless link in which a base station transmits data or control signals to a terminal. In the multiple access method as described above, data or control information of each user is classified by allocating and operating so that time-frequency resources for carrying data or control information for each user do not overlap with each other, that is, so that orthogonality is established.

Because a future communication system after LTE, that is, a 5G communication system should be able to freely reflect various requirements such as users and service providers, services that simultaneously satisfy various requirements should be supported. Services considered for 5G communication systems include enhanced mobile broadband (eMBB), massive machine type communication (mMTC), ultra reliability low latency communication (URLLC), etc.

The eMBB aims to provide a more improved data rate than the data rate supported by the existing LTE, LTE-A, or LTE-Pro. For example, in a 5G communication system, the eMBB should be able to provide a peak data rate of 20 Gbps in downlink and 10 Gbps in uplink from the viewpoint of one base station. Further, the 5G communication system should provide the peak data rate and simultaneously provide the increased user perceived data rate of the terminal. In order to satisfy these requirements, it is required to improve various transmission and reception technologies including more advanced multi-input multi-output (MIMO) transmission technologies. Further, signals are transmitted using a maximum 20 MHz transmission bandwidth in a 2 GHz band used by current LTE, whereas the 5G communication system uses a wider frequency bandwidth than 20 MHz in a frequency band of 3 to 6 GHz or 6 GHz or higher to satisfy a data rate requiring in the 5G communication system.

At the same time, mMTC is being considered to support application services such as the Internet of Things (IoT) in 5G communication systems. In order to efficiently provide the Internet of Things, mMTC is required to support access to a large-scale terminal within a cell, to improve terminal coverage, an improved battery time, and to reduce a terminal cost. The IoT is attached to various sensors and various devices to provide communication functions; thus, it should be able to support a large number of terminals (e.g., 1,000, 000 terminals/km2) within a cell. Further, the terminal supporting mMTC is highly likely to be positioned in a shaded area not covered by the cell, such as the basement of a building because of the feature of the service to require wider coverage compared to other services provided by the 5G communication system. The terminal supporting mMTC should be a low-cost terminal, and because it is difficult to exchange a battery of the terminal frequently, a very long battery life time such as 10 to 15 years is required.

Finally, URLLC is a cellular-based wireless communication service used for a mission-critical purpose. For example, services used for remote control of robots or machinery, industrial automation, unmanned aerial vehicles, remote health care, emergency alerts, etc., may be considered. Therefore, communication provided by URLLC should provide very low latency and very high reliability. For example, a service supporting URLLC should satisfy air interface latency of less than 0.5 milliseconds, and simultaneously have a requirement of a packet error rate of 10^-5 or less. Therefore, for a service supporting URLLC, a 5G system should provide a smaller transmit time interval (TTI) than other services, and at the same time, in order to secure the reliability of the communication link, design requirements that should allocate a wide resource in the frequency band are required.

Three services of 5G, that is, eMBB, URLLC, and mMTC, may be multiplexed and transmitted in one system. In this case, in order to satisfy different requirements of each service, different transmission and reception techniques and transmission and reception parameters may be used between services.

Hereinafter, a frame structure of the 5G system will be described in more detail with reference to the drawings.

FIG. 1 is a diagram illustrating a basic structure of a time-frequency domain, which is a radio resource region in which data or control channels are transmitted in a 5G system.

Figure 2:
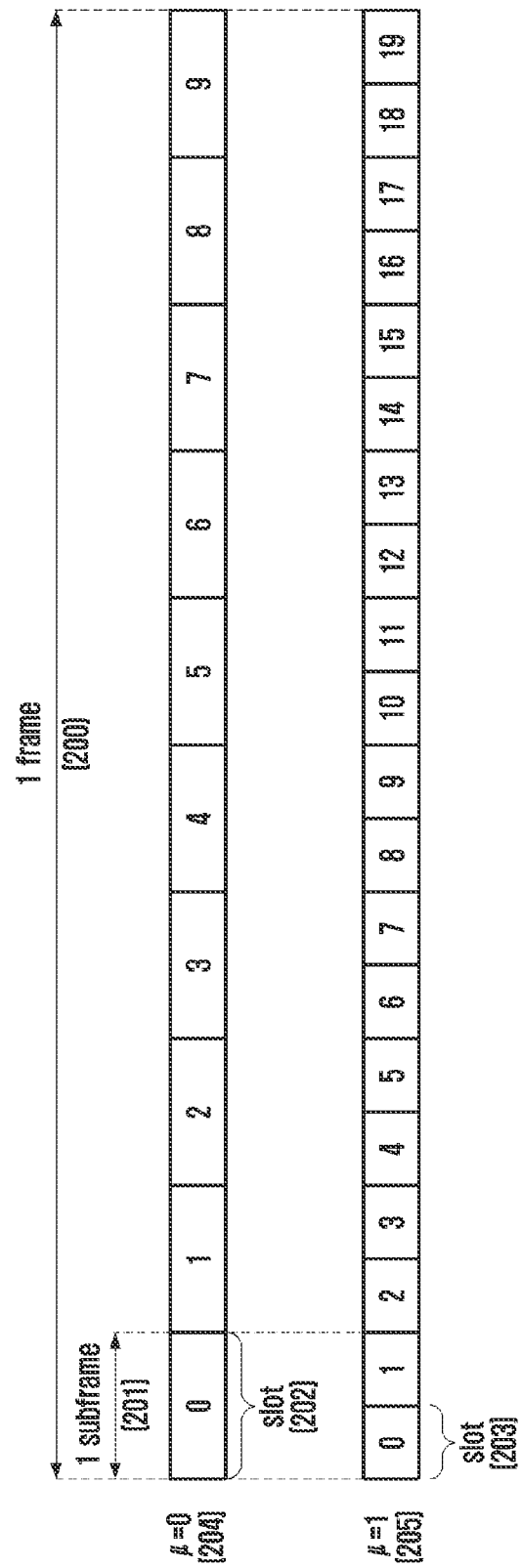
FIG. 2 is a diagram illustrating a slot structure in a 5G communication system.

In FIG. 1, the horizontal axis represents a time domain and the vertical axis represents a frequency domain. A basic unit of a resource in the time and frequency domains is a resource element (RE) 101 and may be defined as 1 orthogonal frequency division multiplexing (OFDM) symbol 102 on the time axis and 1 subcarrier 103 on the frequency axis. In the frequency domain, the $N_{SC}^{RB}$ number (e.g., 12) of consecutive REs may constitute one resource block (RB) 104. FIG. 2 is a diagram illustrating a slot structure considering in a 5G communication system.

FIG. 2 illustrates an example of a structure of a frame 200, a subframe 201, and a slot 202. 1 frame 200 may be defined as 10 ms. 1 subframe 201 may be defined as 1 ms; thus, 1 frame 200 may be configured with total 10 subframes 201. 1 slots 202 and 203 may be defined as 14 OFDM symbols (i.e., the number $N_{symb}^{slot}$ of symbols per slot=14). 1 subframe 201 may be configured with one or a plurality of slots 202 and 203, and the number of slots 202 and 203 per subframe 201 may vary according to a configuration value μ 204 and 205 for subcarrier spacing. In an example of FIG. 2, when μ=0 (204) and μ=1 (205) as subcarrier spacing configuration values are illustrated. When μ=0 (204), 1 subframe 201 may be configured with 1 slot 202, and when μ=1 (205), 1 subframe 201 may be configured with 2 slots 203. That is, the number $N_{slot}^{subframe,\mu}$ of slots per subframe may vary according to the configuration value μ for the subcarrier spacing; thus, the number $N_{slot}^{frame,\mu}$ of slots per frame may vary. $N_{slot}^{subframe,\mu}$ and $N_{slot}^{frame,\mu}$ according to each subcarrier spacing configuration p may be defined to Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
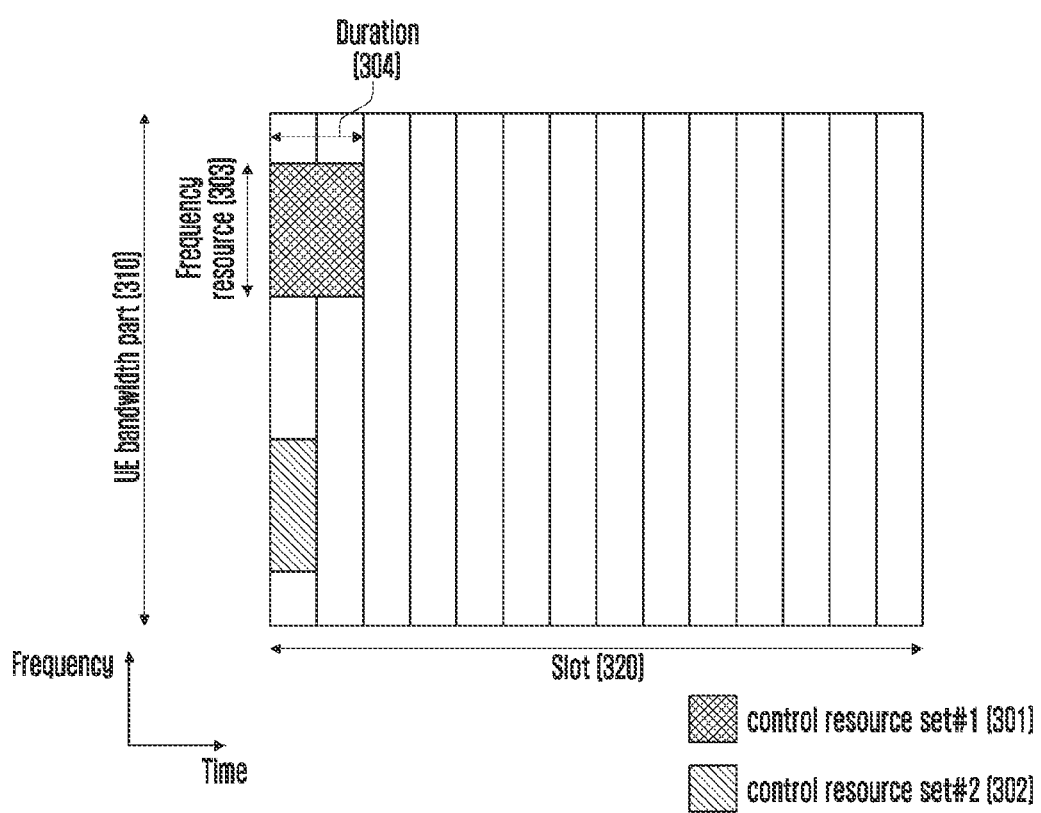
FIG. 3 is a diagram illustrating an example of configuring a control region of a downlink control channel in a 5G communication system.

FIG. 3 is a diagram illustrating an example of a configuration of a bandwidth part in a 5G communication system.

FIG. 3 illustrates an example in which a terminal bandwidth 300 is configured with two bandwidth parts, that is, a bandwidth part #1, 301 and a bandwidth part #2, 302. The base station may configure one or aplurality of bandwidth parts to the terminal, and configure the following information for each bandwidth part.

TABLE 2

| | |
|---|---|
| BWP ::= | SEQUENCE { |
| bwp-Id | BWP-Id, |
| (bandwidth part identifier) | |
| locationAndBandwidth | INTEGER (1..65536), |
| (bandwidth part location) | |
| subcarrierSpacing | ENUMERATED (n0, n1, n2, n3, n4, n5) |
| (subcarrier spacing) | |
| cyclicPrefix | ENUMERATED { extended } |
| (cyclic prefix) | |
| } | |

In addition to the configuration information, various parameters related to the bandwidth part may be configured to the terminal. The information may be transmitted from the base station to the terminal through higher layer signaling, for example, RRC signaling. At least one bandwidth part among the configured one or a plurality of bandwidth parts may be activated. Whether to activate the configured bandwidth part may be semi-statically transmitted from the base station to the terminal through RRC signaling or may be dynamically transmitted through DCI.

The terminal before the RRC connection may receive a configuration of an initial bandwidth part (initial BWP) for initial access from the base station through a master information block (MIB). More specifically, the terminal may receive configuration information on a search space and a control resource set (CORESET) that may transmit a PDCCH for receiving system information (may correspond to remaining system information; RMSI or a system information block 1; SIB1) required for initial access through the MIB in an initial access step. The CORESET and the search space configured through the MIB may be regarded as an identity (ID) 0, respectively.

The base station may transmit configuration information such as frequency allocation information, time allocation information, and numerology for a CORESET #0 to the terminal through the MIB. Further, the base station may notify the terminal of configuration information on occasion and a monitoring period for a CORESET #0, that is, configuration information on a search space #0 through the MIB. The terminal may regard the frequency domain configured as a CORESET #0 obtained from the MIB as an initial bandwidth part for initial access. In this case, the identity (ID) of the initial bandwidth part may be regarded as 0.

The configuration of the bandwidth part supported by the 5G may be used for various purposes.

For example, when a bandwidth supported by the terminal is smaller than a system bandwidth, it may be supported by configuring the bandwidth part. For example, by configuring a frequency position (configuration information 2) of the bandwidth part in the [Table 2] to the terminal, the terminal may transmit and receive data at a specific frequency position within the system bandwidth.

As another example, for the purpose of supporting different neurology, the base station may configure a plurality of bandwidth parts to the terminal. For example, in order to support both transmission and reception of data using subcarrier spacing of 15 kHz and subcarrier spacing of 30 kHz to a terminal, the base station may configure two bandwidth parts to subcarrier spacing of 15 kHz and 30 kHz, respectively. Different bandwidth parts may be frequency division multiplexed, and when data is to be transmitted and received at specific subcarrier spacing, a bandwidth part configured at corresponding subcarrier spacing may be activated.

As another example, for the purpose of reducing power consumption of the terminal, the base station may configure a bandwidth part having a different size of bandwidth to the terminal. For example, when the terminal supports a very large bandwidth, for example, 100 MHz, and always transmits and receives data with the corresponding bandwidth, very large power consumption may be caused. In particular, in a situation where there is no traffic, to monitor an unnecessary downlink control channel with a large bandwidth of 100 MHz is very inefficient in terms of power consumption. For the purpose of reducing power consumption of the terminal, the base station may configure a bandwidth part of a relatively small bandwidth to the terminal, for example, a bandwidth part of 20 MHz. In a situation where there is no traffic, the terminal may perform a monitoring operation in the bandwidth part of 20 MHz, and when data is generated, the terminal may transmit and receive data with the bandwidth part of 100 MHz according to the instruction of the base station.

In a method of configuring the bandwidth part, terminals before RRC connection may receive configuration information on an initial bandwidth part (Initial BWP) through an MIB in an initial access step. More specifically, the terminal may receive a configuration for a CORESET for a downlink control channel in which downlink control information (DCI) scheduling a system information block (SIB) may be transmitted through an MIB received through a physical broadcast channel (PBCH). A bandwidth of the CORESET configured through the MIB may be regarded as an initial bandwidth part, and the terminal may receive a PDSCH that transmits the SIB through the configured initial bandwidth part. In addition to the purpose of receiving the SIB, the initial bandwidth part may be used for other system information (OSI), paging, and random access.

Next, downlink control information (DCI) in the 5G system will be described in detail.

In the 5G system, scheduling information on uplink data (or physical uplink shared channel (PUSCH)) or downlink data (or physical downlink shared channel (PDSCH)) is transmitted from the base station to the terminal through DCI. The terminal may monitor a DCI format for fallback and a DCI format for non-fallback for the PUSCH or the PDSCH. The fallback DCI format may be configured with a fixed field pre-defined between the base station and the terminal, and the non-fallback DCI format may include a configurable field.

The DCI may be transmitted through a physical downlink control channel (PDCCH) via a channel coding and modulation process. A cyclic redundancy check (CRC) may be attached to a DCI message payload, and be scrambling with a radio network temporary identifier (RNTI) corresponding to the identity of the terminal. Different RNTIs may be used according to the purpose of the DCI message, for example, UE-specific data transmission, power control command, or random access response. That is, the RNTI may be not explicitly transmitted, but may be included in a CRC calculation process and transmitted. Upon receiving the DCI message transmitted on the PDCCH, the terminal may identify the CRC using the allocated RNTI, and when the CRC check result is correct, the terminal may know that the message has been transmitted to the terminal.

For example, DCI scheduling a PDSCH for system information (SI) may be scrambled with an SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying transmit power control (TPC) may be scrambled with a TPC-RNTI. DCI scheduling the UE-specific PDSCH or PUSCH may be scrambled with a cell RNTI (C-RNTI).

A DCI format 0_0 may be used as a fallback DCI for scheduling a PUSCH, and in this case, a CRC may be scrambled with a C-RNTI. The DCI format 0_0 in which the CRC is scrambled with the C-RNTI may include, for example, the following information.

TABLE 3

Identifier for DCI formats - [1] bit
Frequency domain resource assignment - [$\log_2 N_{RB}^{UL\ BWP}(N_{RB}^{UL\ BWP} + 1)/2$] bits TABLE 3-continued Time domain resource assignment - 4bits
Frequency hoping flag - 1bit
Modulation and coding scheme -5bits
New data indicator - 1bit
Redundancy version - 2bits
HARQ process number - 4bits
Transmit power control (TPC) command for scheduled PUSCH - [2] bits
UL/supplementary UL (SUL) indicator - 0 or 1 bit A DCI format 0_1 may be used as non-fallback DCI for scheduling a PUSCH, and in this case, the CRC may be scrambled with a C-RNTI. The DCI format 0_1 in which the CRC is scrambled with a C-RNTI may include, for example, the following information.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
   For resource allocation type 0, [$N_{RB}^{ULBWP}$/P] bits
   For resource allocation type 1, [$\log_2(N_{RB}^{ULBWP}(N_{RB}^{ULBWP} + 1)/2)$] bits
Time domain resource assignment -1, 2, 3, or 4 bits
VRB-to-PRB mapping - 0 or 1 bit, only for resource allocation type 1.
   0 bit if only resource allocation type 0 is configured;
     1 bit otherwise.
Frequency hopping flag - 0 or 1 bit, only for resource allocation type 1.
   0 bit if only resource allocation type 0 is configured;
   1 bit otherwise.
     Modulation and coding scheme - 5 bits
     New data indicator - 1 bit
     Redundancy - 2 bits
     HARQ process number - 4 bits
     1st downlink assignment index - 1 or 2 bits
   1 bit for semi-static HARQ-ACK codebook;
   2 bits for dynamic HARQ-ACK codebook with single HARQ-ACK codebook.
     2nd downlink assignment index - 0 or 2 bits
   2 bits for dynamic HARQ-ACK codebook with two HARQ-ACK sub-
    codebooks;
   0 bit otherwise.
TPC command for scheduled PUSCH - 2 bits SRS resource indicator - $\left[\log_2\left(\sum_{k=1}^{Lsrs}\binom{Nsrs}{k}\right)\right]$ or $[\log_2(N_{SRS})]$ bits $\log_2\left(\sum_{k=1}^{Lsrsmax}\binom{Nsrs}{k}\right)$ bits for codebook based PUSCH transmission

[$\log_2(N_{SRS})$] bits for codebook based PUSCH transmission
Precoding information and number of layers - up to 6 bits
Antenna ports - up to 5 bits
SRS request - 2 bits
CSI request - 0, 1, 2, 3, 4, 5, or 6 bits
CBG (code block group) transmission information - 0, 2, 4, 6, or 8 bits
PTRS-DMRS association (phase tracking reference signal - demodulation reference signal relationship) - 0 or 2 bits
beta_offset indicator - 0 or 2 bits
DMRS sequence initialization - 0 or 1 bit A DCI format 1_0 may be used as a fallback DCI for scheduling a PDSCK, and in this case, the CRC may be scrambled with a C-RNTI. The DCI format 1_0 in which the CRC is scrambled with a C-RNTI may include, for example, the following information.

TABLE 5

Identifier for DCI formats - [1] bit
Frequency domain resource assignment-[ $\log_2(N_{RB}^{DL\ BWP}(N_{RB}^{DL\ BWP} + 1)/2$) bits TABLE 5-continued Time domain resource assignment - 4 bits
VRB-to-PRB mapping - 1 bit
Modulation and coding scheme - 5 bits
New data indicator - 1 bit
Redundancy version - 1 bit
HARQ process number - 4 bits
Downlink assignment index - 2 bits
TPC command for scheduled PUCCH - [2] bits
PUCCH (physical unlink control channel) resource indicator - 3 bits
PDSCH-to-HARQ feedback timing indicator- [3] bits A DCI format 1_1 may be used as a non-fallback DCI for scheduling the PDSCH, and in this case, the CRC may be scrambled with a C-RNTI. The DCI format 1_1 in which the CRC is scrambled with a C-RNTI may include, for example, the following information.

TABLE 6

Carrier indicator - 0 or 3bits
Identifier for DCI formats - [1] bits
Bandwidth part indicator - 0, 1 or 2 bits
Frequency domain resource assignment
    For resource allocation type 0, $[N_{RB}^{DL\ BWP}/P]$ bits
    For resource allocation type 1,
    $[\log_2(N_{RB}^{DL\ BWP}(N_{RB}^{DL\ BWP}+1)/2)]$ bits
Time domain resource assignment- 1, 2, 3, or 4 bits
VRB-to-PRB mapping - 0 or 1 bit, only for resource allocation type 1.
• 0 bit if only resource allocation type 0 is configured;
• 1 bit otherwise.
PRB bundling size indicator - 0 or 1 bit
Rate matching indicator - 0, 1, or 2 bits
ZP CSI-RS trigger (0 power channel state information reference signal trigger) - 0, 1 or 2 bits
For transport block 1.
Modulation and coding scheme - 5 bits
New data indicator - 1 bit
Redundancy version - 2 bits
For transport block 2
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2bits
CBG transmission information - 0, 2, 4, 6 or 8 bits
CBG flushing out information - 0 or 1 bit
DMRS sequence initialization - 1 bit Hereinafter, a downlink control channel in a 5G communication system will be described in more detail with reference to the drawings.

FIG. 3 is a diagram illustrating an example of a control resource set (CORESET) in which a downlink control channel is transmitted in a 5G wireless communication system.

FIG. 3 illustrate an example in which two CORESETs (CORESET #1, 301, CORESET #2, 302) are configured within a bandwidth part 310 of the terminal on a frequency axis and one slot 320 on a time axis. The CORESETs 301 and 302 may be configured in a specific frequency resource 303 within an entire terminal bandwidth part 310 on the frequency axis. The time axis may be configured with one or a plurality of OFDM symbols, and this may be defined as control resource set duration 304. In an example of FIG. 3, the CORESET #1, 301 is configured with control resource set duration of 2 symbols, and the CORESET #2, 302 is configured with control resource set duration of 1 symbol.

The CORESET in 5G described above may be configured by the base station to the terminal through higher layer signaling (e.g., system information, MIB, radio resource control (RRC) signaling). Configuring a CORESET to a terminal means providing information such as a CORESET identifier, a frequency position of the CORESET, and a symbol length of the CORESET. For example, it may include the following information.

TABLE 7

```
ControlResourceSet ::=                    SEQUENCE{
      Corresponds to L1 parameter 'CORSET-ID'
controlResourceSetId       CotnrolResourceSetId,
(control region identity)
frequencyDomainResources        BIT STRING (SIZE (45)),
(frequency axis resource assignment information)
duration                              INTEGER
(1..maxCoReSetDuration),
   (time axis resource assignment information)
   cce-REG-MappingType                CHOICE{
   (CCE-to-REG mapping method)
      interleaved                  SEQUENCE{
         reg-BundleSize
ENUMERATED (n2, n3, n6)
         (REG bundle size)
         precoderGranularity           ENUMERATED
{sameAsREG-bundle, allContiguousRBs},
      interleaverSize
      ENUMERATED (n2, n3, n6)
         (interleaver size)
         shiftIndex
         INTEGER(0..maxNrofPhysicalResourceBlocks-1)
         OPTIONAL
         (interleaver shift)
      },
nonInterleaved              NULL
},
tci-StatesPDCCH              SEQUENCE(SIZE
(1..maxNrofTCI-StatesPDCCH)) OF TCI-StateId       OPTIONAL,
(QCL configuration information)
tei-PresentInDCI             ENUMERATED {enabled}
OPTIONAL, -- Need S
}
```

In Table 7, tci-StatesPDCCH (simply referred to as TCI state) configuration information may include information of one or a plurality of synchronization signal (SS)/PBCH block indexes in a quasi co located (QCL) relationship with the DMRS transmitted from the corresponding CORESET or a channel state information reference signal (CSI-RS) index.

Figure 4:
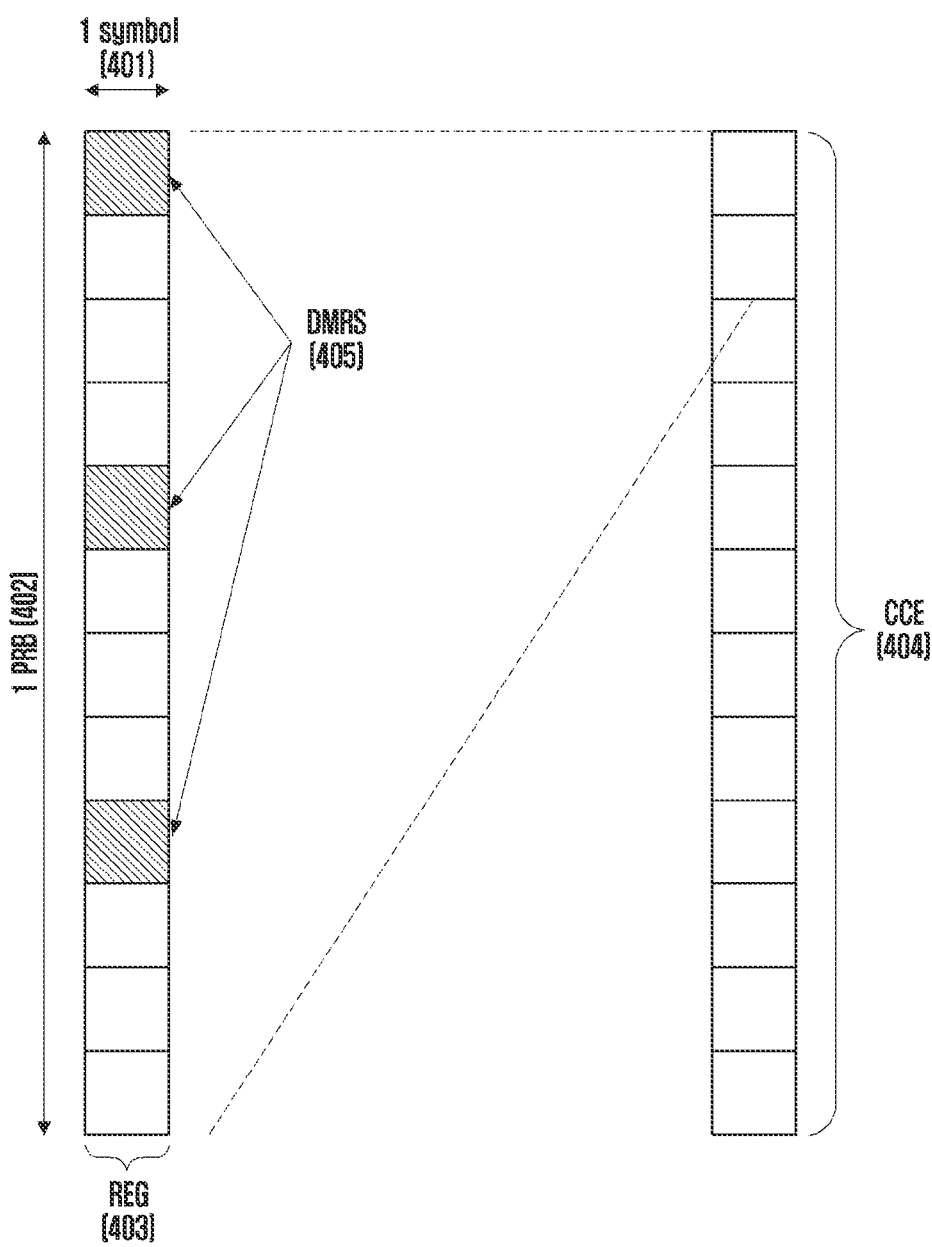
FIG. 4 is a diagram illustrating an example of a basic unit structure of time and frequency resources of a downlink control channel in a 5G communication system.

FIG. 4 is a diagram illustrating an example of a basic unit of time and frequency resources constituting a downlink control channel that can be used in 5G. According to FIG. 4, the basic unit of time and frequency resources constituting the control channel is referred to as a resource element group (REG) 403, and the REG 403 may be defined as 1 OFDM symbol 401 on the time axis and 1 physical resource block (PRB) 402 on the frequency axis, that is, 12 subcarriers. A downlink control channel allocation unit may be configured to concatenate the REG 403.

As illustrated in FIG. 4, when a basic unit to which a downlink control channel is allocated in 5G is a control channel element (CCE) 404, 1 CCE 404 may be configured with a plurality of REGs 403. When the REG 403 illustrated in FIG. 4 is described as an example, the REG 403 may be configured with 12 REs, and when 1 CCE 404 is configured with 6 REGs 403, 1 CCE 404 may be configured with 72 REs. When a downlink CORESET is configured, the corresponding region may be configured with a plurality of CCEs 404, and a specific downlink control channel may be mapped and transmitted into one or a plurality of CCEs 404 according to an aggregation level (AL) within the CORESET. The CCEs 404 in the control region are classified by numbers, and in this case, the numbers may be assigned according to a logical mapping method.

The basic unit of the downlink control channel illustrated in FIG. 4, that is, the REG 403 may include both REs to which DCI is mapped and a region to which a DMRS 405, which is a reference signal for decoding the REs, is mapped. As illustrated in FIG. 4, three DMRSs 405 may be transmitted in 1 REG 403.

The number of CCEs required for transmitting the PDCCH may be 1, 2, 4, 8, and 16 according to the aggregation level (AL), and the number of different CCEs may be used for implementing link adaptation of the downlink control channel. For example, when AL=L, one downlink control channel may be transmitted through the L number of CCEs. The terminal should detect a signal without knowing information on the downlink control channel, and a search space representing a set of CCEs has been defined for blind decoding. The search space is a set of downlink control channel candidates consisting of CCEs in which the terminal should attempt decoding on a given aggregation level. Because there are various aggregation levels that make one bundle of 1, 2, 4, 8, and 16 CCEs, the terminal has a plurality of search spaces. The search space set may be defined as a set of search spaces at all configured aggregation levels.

The search space may be classified into a common search space and a UE-specific search space. A certain group of terminals or all terminals may examine a common search space of the PDCCH in order to receive cell-common control information such as a paging message or dynamic scheduling for system information. For example, PDSCH scheduling allocation information on transmission of SIB including cell operator information, etc., may be received by examining the common search space of the PDCCH. Because a certain group of terminals or all terminals should receive a PDCCH, the common search space may be defined as a set of predetermined CCEs.

Scheduling allocation information on the UE-specific PDSCH or PUSCH may be received by examining the UE-specific search space of the PDCCH. The UE-specific search space may be defined UE-specifically as a function of the identity of the terminal and various system parameters.

In 5G, a parameter for a search space for a PDCCH may be set from the base station to the terminal through higher layer signaling (e.g., SIB, MIB, RRC signaling). For example, the base station may configure the number of PDCCH candidates at each aggregation level L, a monitoring period for the search space, monitoring occasion of the symbol unit in the slot for the search space, a search space type (common search space or UE-specific search space), a combination of the RNTI and the DCI format to be monitored in the corresponding search space, and the CORESET index to monitor the search space to the terminal. For example, it may include the following information.

TABLE 8

```
SearchSpace ::=                          SEQUENCE {
                       Identity of the search space, SearchSpaceId = 0 identifies the
                       SearchSpace configured via PBCH (MIB) or
                       ServingCellConfigCommon.
searchSpaceId                            SearchSpaceId,
(search space identifier)
controlResorceSetId                      ControlResourcSetId,
(control region identifier)
monitoringSlotPeriodicityAndOffset       CHOICE {
(monitoring slot level period)
   sl1                                      NULL,
   sl2                                      INTEGER
(0..1),
   sl4                                      INTEGER
(0..3),
   sl5                                      INTEGER(0..4),
   sl8                                      INTEGER
(0..7),
   sl10                                     INTEGER(0..9),
   sl16                                     INTEGER(0..15),
   sl20                                     INTEGER(0..19),
}
                       OPTIONAL,
duration (monitoring length)             INTEGER(2..2559),
monitoringSymbolsWithinSlot                 BIT STRING (SIZE (14))
OPTIONAL,
(monitoring symbol within slot)
nrofCandidates                           SEQUENCE {
(the number of PDCCH candidates for each aggregation level)
aggragationLevel1                        ENUMERATED (n0, n1, n2,
n3, n4, n5, n6, n8),
aggragationLevel2                        ENUMERATED (n0, n1, n2,
n3, n4, n5, n6, n8),
aggragationLevel4                        ENUMERATED (n0, n1, n2,
n3, n4, n5, n6, n8),
aggragationLevel8                        ENUMERATED (n0, n1, n2,
n3, n4, n5, n6, n8),
aggragationLevel16                       ENUMERATED (n0, n1, n2,
n3, n4, n5, n6, n8)
},
searchSpaceType                          CHOICE {
(search space type)
--Configures this search space as common search space (CSS)
and DCI formats to monitor,
```

TABLE 8-continued

| | |
|---|---|
| common<br>(common search space)<br>} | SEQUENCE { |
| ue-Specific<br>(UE-specific search space)<br>--Indicates whether the UE monitors in this USS for DCI formats<br>    0-0 and 1-0 or for formats 0-1 and 1-1,<br>        formats<br>ENUMERATED (formats0-0-And-1-0, formats0-1-And-1-1),<br>    ...<br>} | SEQUENCE { |

The base station may configure one or a plurality of search space sets to the terminal according to the configuration information. For example, the base station may configure a search space set 1 and a search space set 2 to the terminal, configure to monitor a DCI format A scrambled with an X-RNTI in the search space set 1 in a common search space, and configure to monitor a DCI format B scrambled with a Y-RNTI in the search space set 2 in a UE-specific search space.

According to the configuration information, one or a plurality of search space sets may exist in a common search space or a UE-specific search space. For example, the search space set #1 and the search space set #2 may be configured as a common search space, and a search space set #3 and a search space set #4 may be configured as UE-specific search spaces.

In the common search space, a combination of the following DCI format and RNTI may be monitored.
DCI format 0_0/1_0 with CRC scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI
In the UE-specific search space, a combination of the following DCI format and RNTI may be monitored.
DCI format 0_0/1_0 with CRC scrambled by C-RNTI, CS-RNTI, TC-RNTI
DCI format 1_0/1_1 with CRC scrambled by C-RNTI, CS-RNTI, TC-RNTI The RNTIs specified above may follow the following definitions and uses.
C-RNTI (Cell RNTI): For UE-specific PDSCH scheduling
TC-RNTI (Temporary Cell RNTI): For UE-specific PDSCH scheduling
CS-RNTI (Configured Scheduling RNTI): For semi-statically configured UE-specific PDSCH scheduling
RA-RNTI (Random Access RNTI); For scheduling a PDSCH in a random access step
P-RNTI (Paging RNTI): For scheduling a PDSCH in which paging is transmitted
SI-RNTI (System Information RNTI): For scheduling a PDSCH in which system information is transmitted
INT-RNTI (Interruption RNTI): For notifying whether a PDSCH is punctured
TPC-PUSCH-RNTI (Transmit Power Control for PUSCH RNTI): For instructing a power control command for a PUSCH
TPC-PUCCH-RNTI (Transmit Power Control for PUCCH RNTI): For instructing a power control command for a PUCCH
TPC-SRS-RNTI (Transmit Power Control for SRS RNTI): For instructing a power control command for SRS The DCI formats specified above may follow the following definition.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A CORESET p in 5G and the search space of an aggregation level L in a search space set s may be represented as the following equation.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 1]}$$

L: aggregation level
$n_{CI}$: Carrier index
$N_{CCE,p}$: the total number of CCEs existing in a control region p
$n_{s,f}^\mu$: slot index
$M_{p,s,max}^{(L)}$: the number of PDCCH candidates of an aggregation level L
$m_{snCI}=0, \ldots, M_{p,s,max}^{(L)}-1$: index of PDCCH candidates of an aggregation level L
$i=0, \ldots, L-1$
$Y_{p,n_{s,f}^\mu}=(A_p \cdot Y_{p,n_{s,f}^\mu-1}) \bmod D$, $Y_{p,-1}=n_{RNTI} \neq 0$, $A_0=39827$, $A_1=39829$, $A_2=39839$, $D=65537$
$n_{RNTI}$: terminal identifier The value of $Y\_(p,n_{s,f}^\mu)$ may correspond to 0 in the case of a common search space. In the case of a UE-specific search space, the $Y\_(p,n_{s,f}^\mu)$ value may correspond to a value that changes according to the identity (C-RNTI or an ID configured by the base station to the terminal) of the terminal and a time index.

Hereinafter, a method of transmitting discrete Fourier transform spreading orthogonal frequency division multiplexing (DFT-S-OFDM) considered in the disclosure will be described in detail with reference to the drawings.

Figure 5:
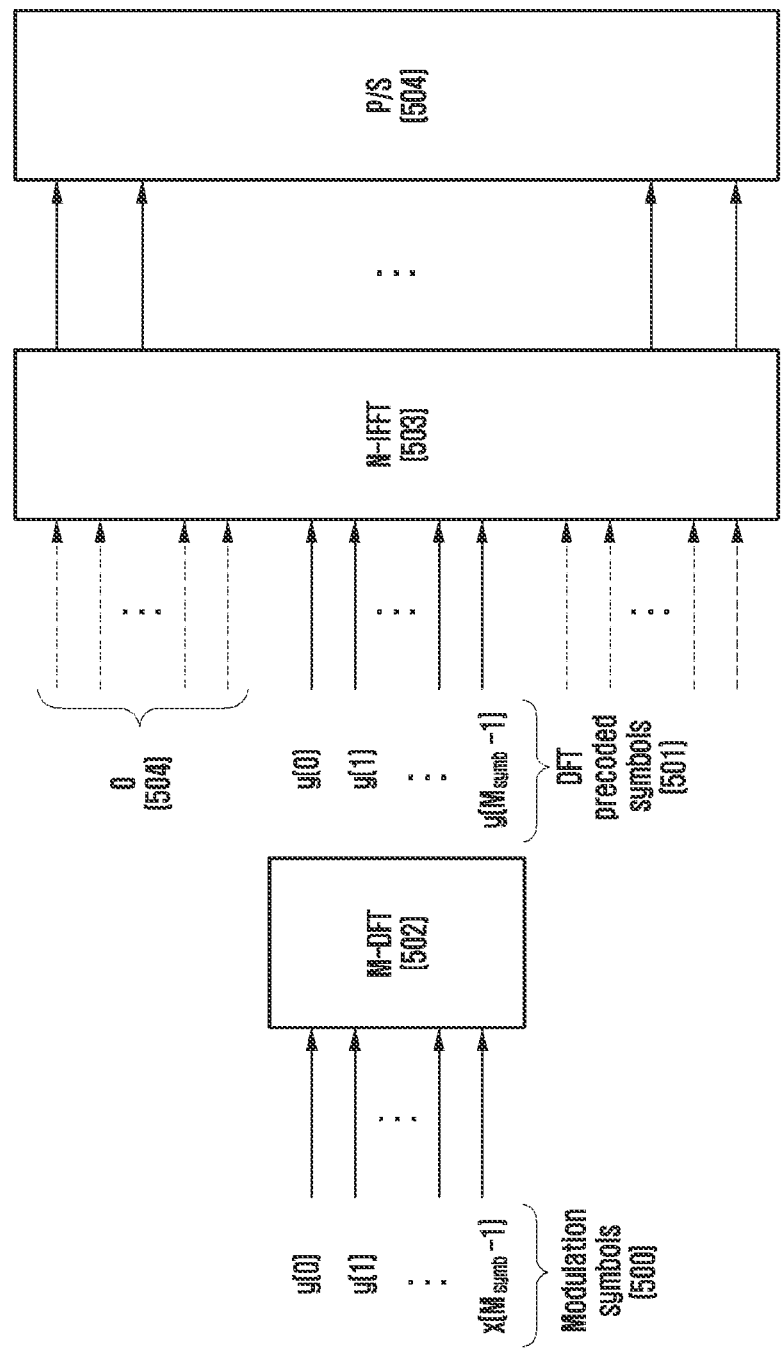
FIG. 5 is a diagram illustrating an example of a localized DFT-S-OFDM transmission scheme according to an embodiment.

FIG. 5 is a diagram illustrating a DFT-S-OFDM transmission structure. DFT precoding of an M size is applied 502 to the total $M_{symb}$ number of modulation symbols 500, x(0), x(1), . . . , x($M_{symb}$−1), and the total M number of DFT precoded symbols (DFT precoded symbol 501, y(0), y(1), . . . , y(M−1) may be output. In this case, x and y may be represented by the following equation.

$$y(k) = \frac{1}{\sqrt{M}} \sum_{i=0}^{M-1} x(i) e^{-j\frac{2\pi ik}{M}}, \text{ where } k = 0, \ldots, M-1 \quad \text{[Equation 2]}$$

The M number of DFT precoded symbols 501 may be mapped to some or all of the total N number of subcarriers and then transformed into time domain symbols through N-size inverse fast Fourier transform (IFFT) 503. In this case, when M<N, data may be mapped and 0 may be filled in the remaining area (504).

According to a method of mapping the DFT precoded symbol in the frequency domain, the DFT precoded symbol may be classified into a localized transmission method and a distributed transmission method.

FIG. 5 illustrates an example of a localized DFT-S-OFDM. A DFT precoded symbol 501 may be continuously mapped in the frequency domain. More specifically, the total M number of DFT precoded symbols, y(0), y(1), . . . , y(M−1) may be continuously mapped to the subcarrier index k, k+1, k+2, . . . , k+M−1.

Figure 6:
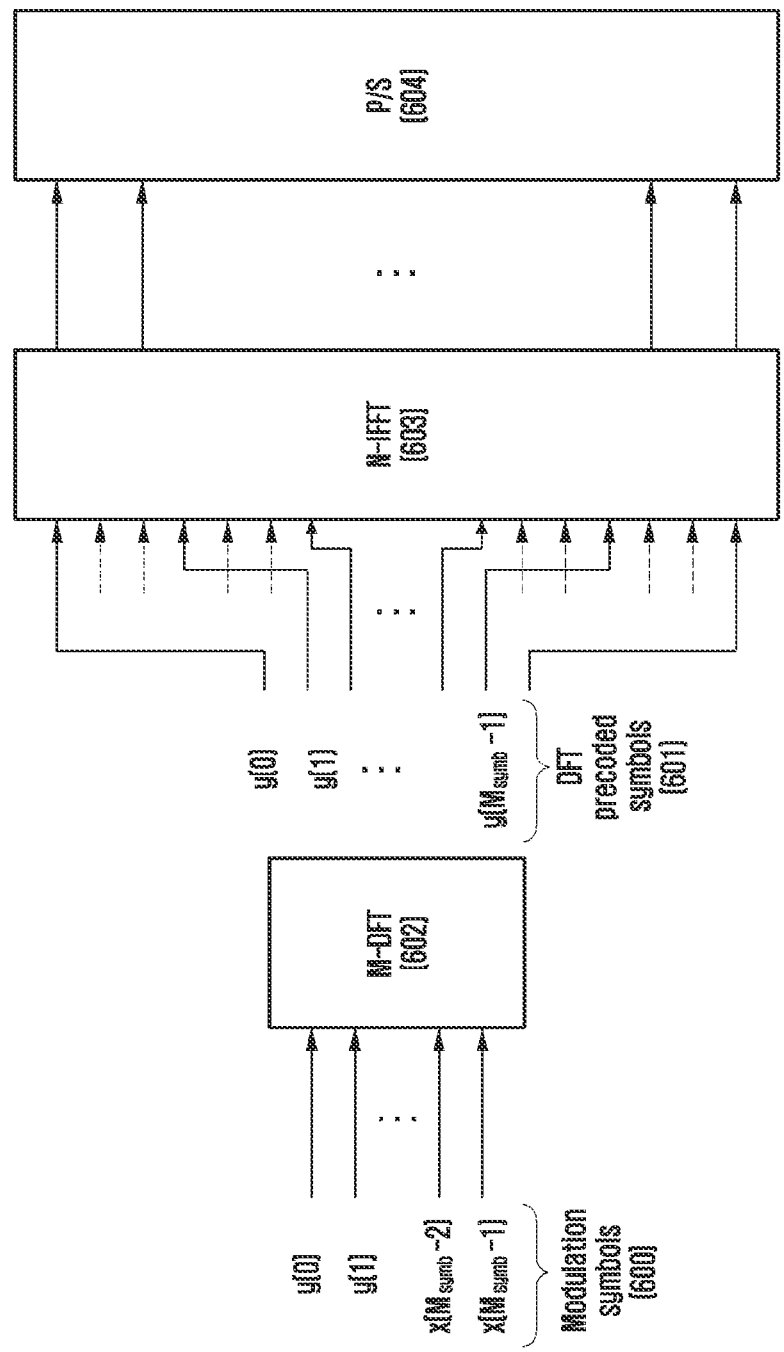
FIG. 6 is a diagram illustrating an example of a distributed DFT-S-OFDM transmission scheme according to an embodiment.

FIG. 6 illustrates an example of a distributed DFT-S-OFDM. DFT precoded symbols 601 may be distributed and mapped at regular intervals in the frequency domain. More specifically, the total M number of DFT precoded symbols, y(0), y(1), . . . , y(M−1) may be mapped to the subcarrier index k, k+1D, k+2D, . . . , k+(M−1)D among the total N number of subcarriers. In this case, it may be determined as D=N/M.

Figure 7:
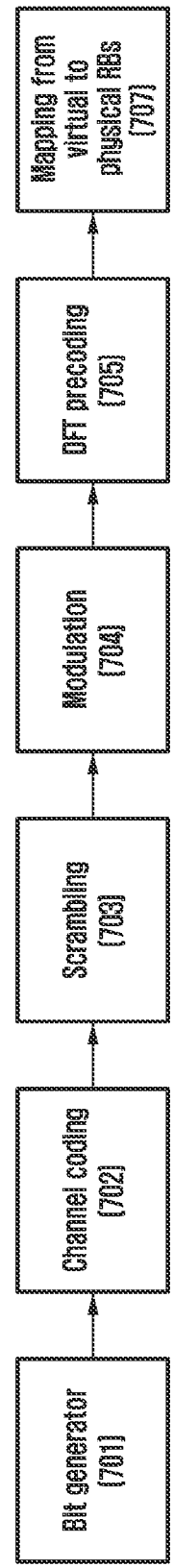
FIG. 7 is a diagram illustrating a DFT-S-OFDM transmission method according to an embodiment.

FIG. 7 is a diagram illustrating a DFT-S-OFDM transmission method.

First, a data bit to be transmitted may be generated 701. The generated data bit may be input as an input value of a channel coder to perform channel coding 702. Scrambling 703 may be performed on the bit sequence (b(0), b(1), . . . , b($M_{bit}$−1)) of the total $M_{bit}$ bits output through channel coding. Output values b'(0), b'(1), . . . , b'($M_{bit}$−1) after scrambling may be defined, for example, as follows.

b'(i)={b(i)+c(i)} modulo 2, i=0, 1, . . . , $M_{bit}$−1, c(i) may be defined as a scrambling sequence. X modulo Y is a module that outputs the remainder of X divided by Y and may correspond to an operator. A bit sequence b' after scrambling 703 may output the $M_{sym}$ number of modulated symbol sequences (d(0), d(1), . . . , d($M_{sym}$−1)) through modulation 704. In 5G, modulation schemes according to the following modulation order are supported.

TABLE 10

| Transform precoding disabled | | Transform precoding enabled | |
|---|---|---|---|
| Modulation scheme | Modulation order $Q_m$ | Modulation scheme | Modulation order $Q_m$ |
| | | π/2-BPSK | 1 |
| QPSK | 2 | QPSK | 2 |
| 16QAM | 4 | 16QAM | 4 |
| 64QAM | 6 | 64QAM | 6 |
| 256QAM | 8 | 256QAM | 8 |

DFT precoding 705 is applied to d(0), d(1), . . . , d($M_{sym}$−1) and a modulation symbol sequence subjected to modulation 704; thus, the DFT precoded symbol sequence y(0), y(1), . . . , y($M_{sym}$−1) may be output. According to Equation 2, y and d may satisfy the following relationship.

$$y(k) = \frac{1}{\sqrt{M_{sym}}} \sum_{i=0}^{M_{sym}-1} d(i) e^{-j\frac{2\pi ik}{M_{sym}}}, \quad \text{[Equation 3]}$$

where $k = 0, \ldots, M_{sym} - 1$

Symbol sequence y(0), y(1), . . . , y($M_{sym}$−1) subjected to DFT precoding 705, may be mapped 707 with a physical resource, that is, time and frequency domain resources. A symbol mapped with a physical resource may be modulated into an OFDM symbol through IFFT and then transmitted.

In the following description, a configuration method for the bandwidth part considered in the 5G communication system will be described.

Figure 8:
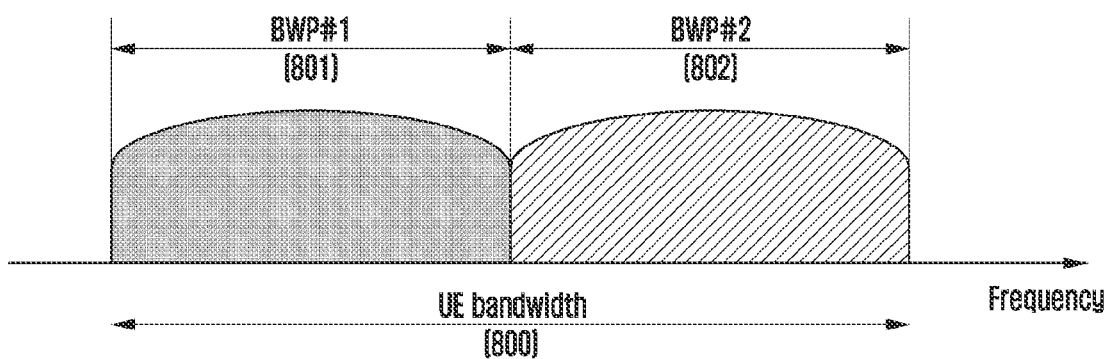
FIG. 8 is a diagram illustrating an example of configuring a bandwidth part in a 5G communication system.

FIG. 8 is a diagram illustrating an example of a configuration of a bandwidth part in a 5G communication system. FIG. 8 illustrates an example in which a terminal bandwidth 800 is configured with two bandwidth parts, i.e., a bandwidth part #1, 801 and a bandwidth part #2, 802. The base station may configure one or a plurality of bandwidth parts to the terminal, and configure the following information for each bandwidth part.

TABLE 11

| BWP ::= | SEQUENCE { |
|---|---|
| bwp-Id | BWP-Id |
| (bandwidth part identifier) | |
| locationAndBandwidth | INTEGER (1..65536), |
| (bandwidth part location and bandwidth) | |
| subcarrierSpacing | ENUMERATED (n0, n1, n2, n3, n4, n5) |
| (subcarrier spacing) | |
| cyclicPrefix | ENUMERATED { extended } |
| (cyclic prefix) | |
| } | |

In addition to the configuration information, various parameters related to the bandwidth part may be configured to the terminal. The information may be transmitted from the base station to the terminal through higher layer signaling, for example, RRC signaling. At least one of the configured one or a plurality of bandwidth parts may be activated. Whether to activate the configured bandwidth part may be semi-statically transmitted from the base station to the terminal through RRC signaling or may be dynamically transmitted through MAC CE or DCI.

The configuration of the bandwidth part supported by the 5G may be used for various purposes.

For example, when a bandwidth supported by the terminal is smaller than a system bandwidth, communication in the bandwidth supported by the terminal may be supported through the configuration of the bandwidth part. For example, by configuring a frequency position (configuration information 2) of the bandwidth part to the terminal in [Table 11], the terminal may transmit and receive data at a specific frequency position within the system bandwidth.

As another example, for the purpose of supporting different neurology, the base station may configure a plurality of bandwidth parts to the terminal. For example, in order to support both transmission and reception of data using subcarrier spacing of 15 kHz and subcarrier spacing of 30 kHz to a terminal, the base station may configure two bandwidth parts to subcarrier spacing of 15 kHz and 30 kHz, respectively. Different bandwidth parts may be frequency division multiplexed (FDM), and when data is to be transmitted and received at specific subcarrier spacing, a bandwidth part configured at the corresponding subcarrier spacing may be activated.

As another example, for the purpose of reducing the power consumption of the terminal, the base station may configure a bandwidth part having different size of bandwidths to the terminal. For example, when the terminal supports a very large bandwidth, for example, 100 MHz, and always transmits and receives data with the corresponding bandwidth, very large power consumption may be caused. In particular, in a situation where there is no traffic, monitoring an unnecessary downlink control channel with a large bandwidth of 100 MHz is very inefficient in terms of power consumption. For the purpose of reducing power consumption of the terminal, the base station may configure a bandwidth part of a relatively small bandwidth to the terminal, for example, a bandwidth part of 20 MHz. In a situation where there is no traffic, the terminal may perform a monitoring operation in the bandwidth part of 20 MHz, and when data is generated, the terminal may transmit and receive data using the bandwidth part of 100 MHz according to the instruction of the base station.

In the method of configuring the bandwidth part, terminals before RRC connection may receive configuration information on the initial bandwidth part through the MIB in an initial access step. More specifically, the terminal may receive a configuration of a CORESET for a downlink control channel in which DCI scheduling SIB may be transmitted from the MIB of the PBCH. A bandwidth of the CORESET configured with the MIB may be regarded as an initial bandwidth part, and the terminal may receive a PDSCH in which the SIB is transmitted through the preset initial bandwidth part. In addition to the purpose of receiving the SIB, the initial bandwidth part may be used for other system information (OSI), paging, and random access.

Hereinafter, a resource allocation method for a PDSCH and a PUSCH in a 5G wireless communication system will be described.

First, a frequency domain resource allocation method will be described.

The base station may allocate resources to the terminal using two types of frequency domain resource allocation methods for a downlink data channel (PDSCH) and an uplink data channel (PUSCH).

Resource allocation type 0: Frequency domain resource allocation information may be notified to the terminal in a bitmap method. In this case, the frequency domain allocation unit indicated by the bitmap may be a resource block group (RBG). That is, data may be allocated to the frequency domain in units of RBG. The RBG may be configured with one or a plurality of RBs, and the number of RBs constituting one RBG, that is, the RBG size (P) may be determined by a combination of the size of the bandwidth part to which data is allocated and a configuration value (e.g., Configuration 1 or Configuration 2) configured with higher layer signaling (e.g., RRC signaling). For example, the RBG size may be determined as illustrated in the following table.

TABLE 12

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the size of the bandwidth part i is an RB, which is $N_{BWP,i}^{size}$, the number of RBGs in the bandwidth part may be determined as follows.

$N_{RBG} = \lceil (N_{BWP,i}^{size} + (N_{BWP,i}^{start} \mod P))/P \rceil$, where the size of the first RBG is $RBG_0^{size} = -N_{BWP,i}^{start} \mod P$, the size of last RBG is $RBG_{last}^{size} = (N_{BWP,i}^{start} + N_{BWP,i}^{size}) \mod P$ if $(N_{BWP,i}^{start} + N_{BWP,i}^{size}) \mod P > 0$ and P otherwise, the size of all other RBGs is P.

Accordingly, because the base station may instruct frequency resource allocation information in one bit per RBG to the terminal, the size of the DCI field corresponding to the frequency domain allocation may correspond to the $N_{RBG}$ bit.

Resource allocation type 1: The frequency domain resource allocation information may be notified to the terminal as information on a starting point of the RB to which the data channel is mapped in the bandwidth part and the number of consecutively allocated RBs. More specifically, a resource allocation field value may be configured with a frequency resource indication value (RIV) corresponding to the start RB ($RB_{start}$) of the RB to which the data channel is allocated and the number ($L_{RBs}$) of consecutive RBs to which the data channel is allocated. The RIV may be defined as follows.

if $(L_{RBs} - 1) \leq \lfloor N_{BWP}^{size} / 2 \rfloor$ then
$RIV = N_{BWP}^{size} (L_{RBs} - 1) + RB_{start}$
else
$RIV = N_{BWP}^{size}(N_{BWP}^{size} - L_{RBs} + 1) + (N_{BWP}^{size} - 1 - RB_{start})$
where $L_{RBs} \geq 1$ and shall not exceed $N_{BWP}^{size} - RB_{start}$.

Accordingly, the size of the DCI field corresponding to the frequency domain allocation may correspond to the $\lceil \log_2(N_{RB}^{BWP}(N_{RB}^{BWP}+1)/2) \rceil$ bit.

Hereinafter, the time domain resource allocation method will be described.

The base station may configure information (e.g., table) on time domain resource allocation information on the PDSCH and PUSCH to the terminal with higher layer signaling (e.g., RRC signaling). For the PDSCH, a table configured with maxNrofDL-Allocations=16 entries may be configured, and for the PUSCH, a table configured with maxNrofUL-Allocations=16 entries may be configured. The time domain resource allocation information may include, for example, PDCCH-to-PDSCH slot timing (corresponds to a time interval in units of slots between a time point when the PDCCH is received and a time point when the PDSCH scheduled by the received PDCCH is transmitted and denoted as K0) or PDCCH-to-PDSCH slot timing (corresponds to a time interval in units of slots between a time point when the PDCCH is received and a time point when the PUSCH scheduled by the received PDCCH is transmitted and denoted as K2), information on a location and length of a start symbol in which the PDSCH or the PUSCH is scheduled within the slot, a PDSCH or PUSCH mapping type, and the like. For example, information such as the following table may be notified from the base station to the terminal.

TABLE 13

PUSCH-TimeDomainResourceAllocationList information element
PUSCH-TimeDomainResourceAllocationList ::=
SEQUENCE TABLE 13-continued

```
(SIZE(1..maxNrofDL-Allocations))
OF PUSCH-TimeDomainResourceAllocation
PUSCH-TimeDomainResourceAllocation ::=    SEQUENCE {
    k0
      INTEGER(0..32)
    OPTIONAL, --Need S
    (PDCCH-to-PUSCH timing, slot unit)
    mappingType           ENUMARATED {typeA, typeB}
    (PUSCH mapping type)
    startSymbolAndLength    INTEGER(0..127)
    (starting symbol and length of PUSCH)
}
```

TABLE 14

```
PUSCH-TimeDomainResourceAllocation information element
PUSCH-TimeDomainResourceAllocationList ::=   SEQUENCE
(SIZE(1..maxNrofUL-Allocations)) OF
PUSCH-TimeDomainResourceAllocation
PUSCH-TimeDomainResourceAllocation ::=    SEQUENCE {
    k2                  INTEGER(0..32)
    OPTIONAL,
    --Need S
    (PDCCH-to-PUSCH timing, slot unit)
    mappingType           ENUMARATED {typeA, typeB},
    (PUSCH mapping type)
    startSymbolAndLength    INTEGER(0..127)
    (starting symbol and length of PUSCH)
}
```

The base station may notify the terminal of one of entries in a table for the time domain resource allocation information through L1 signaling (e.g., DCI) (e.g., may indicate to the 'time domain resource allocation' field in the DCI). The terminal may obtain time domain resource allocation information on the PDSCH or PUSCH based on the DCI received from the base station.

Hereinafter, embodiments of the disclosure will be described in detail together with the accompanying drawings. Hereinafter, an embodiment of the disclosure will be described using a 5G system as an example, but the embodiment of the disclosure may be applied to other communication systems having a similar technical background or channel type. For example, LTE or LTE-A mobile communication and mobile communication technology developed after 5G may be included therein. Accordingly, the embodiments of the disclosure may be applied to other communication systems through some modifications without significantly departing from the scope of the disclosure as determination by a person having skilled technical knowledge.

Further, in describing the disclosure, when it is determined that a detailed description of a related function or configuration may unnecessarily obscure the subject matter of the disclosure, a detailed description thereof will be omitted. Terms to be described later are terms defined in consideration of functions in the disclosure, which may vary according to the intention or custom of users or operators. Therefore, the definition should be made based on the contents throughout the present specification.

Embodiment 1

Figure 9:
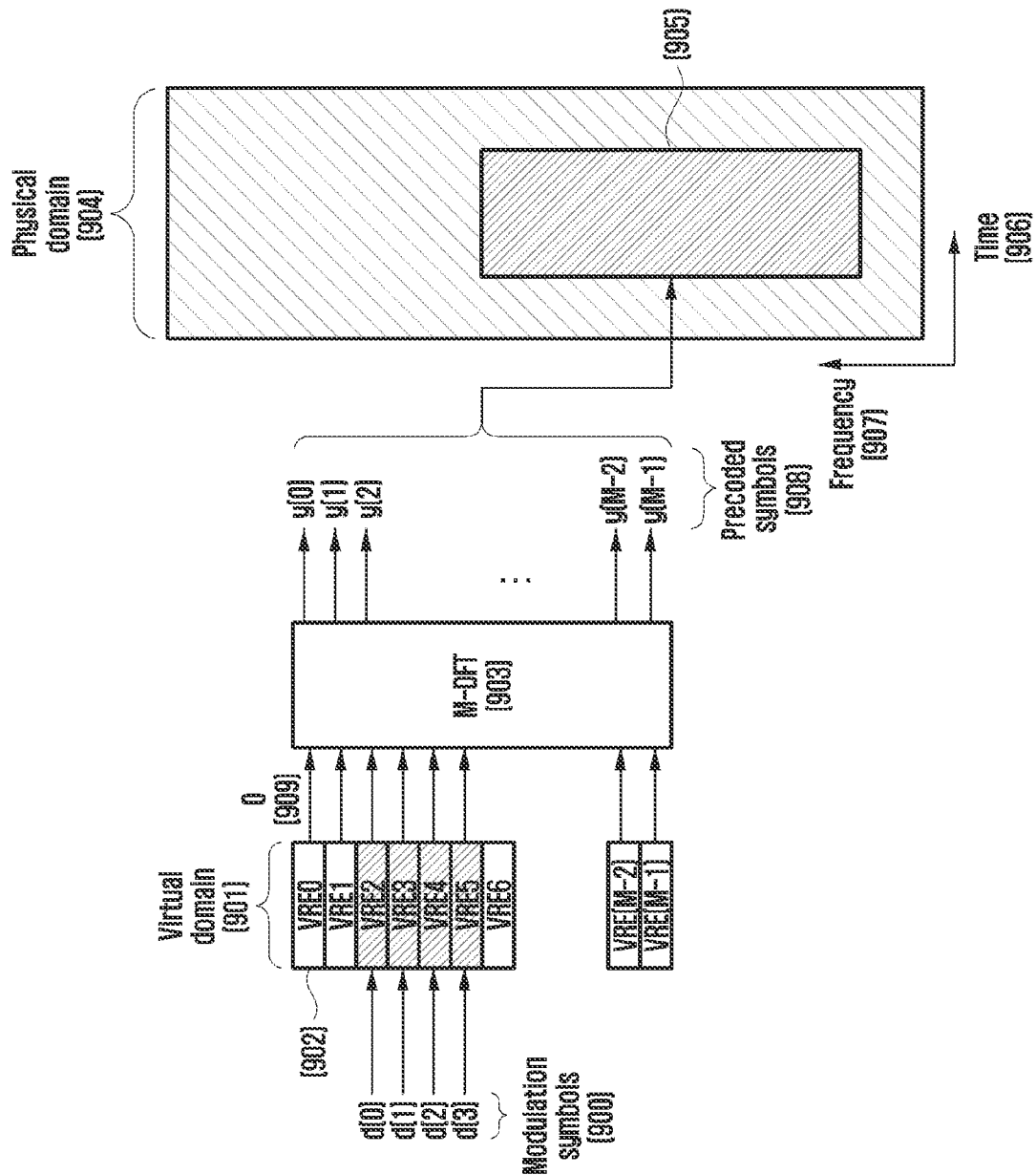
FIG. 9 is a diagram illustrating an example of a resource allocation method according to a first embodiment of the disclosure.

FIG. 9 is a diagram illustrating an example of a resource allocation method and a transmission method for a DFT-S-OFDM-based PDSCH considered in the disclosure.

According to an example illustrated in FIG. 9, sequences (d(0), d(1), . . . , d($M_{sym}$−1)) of the $M_{sym}$ number of modulated symbols 900 may be mapped to a specific virtual RE ($V_{RE}$) 902 in a virtual domain 901 resource. Here, the virtual domain 901 resource may be defined as a resource having a length of a possible symbol sequence that may be input as an input of DFT precoding 903, that is, the number of the DFT size M, and the smallest unit of the virtual domain 901 resource to which the modulated symbol 900 may be mapped may be defined as the VRE 902. That is, DFT precoding (M-DFT) 903 of the size M may be configured with the total M number of VREs 902, VRE0, VRE1, . . . , VRE(M−1). Sequences (d(0), d(1), . . . , d($M_{sym}$−1)) of the $M_{sym}$ number of modulated symbols 900 may be mapped to all or part of the VRE 902 corresponding to the total M number of virtual domain 901 resources. In the example of FIG. 9, it illustrates that the modulated symbols 900, d(0), d(1), d(2), and d(3) are mapped to VRE2, VRE3, VRE4, and VRE5, respectively.

In the virtual domain 901, 0 is inserted 909 into the remaining VRE except for the resource to which the modulated symbol 900 is mapped; thus, sequences x(0), x(1), x(2), . . . , x(M−1) of the total length M may be output. In the example of FIG. 9, x(2)=d(0), x(3)=d(1), x(4)=d(2), x(5)=d(3), and others x(0), x(1), x(6), . . . , x(M−1) may all be 0.

M-DFT precoding 903 is applied to symbol sequences x(0), x(1), x(2), . . . , x(M−1) mapped in the virtual domain 901; thus, sequences (y(0), y(1), . . . , y(M−1)) of the DFT precoded symbol 908 may be output. In this case, y and x may satisfy the following relationship.

$$y(k) = \frac{1}{\sqrt{M}} \sum_{i=0}^{M-1} x(i)e^{-j\frac{2\pi ik}{M}}, \text{ where } k = 0, \ldots, M-1 \quad \text{[Equation 4]}$$

Sequences y(0), y(1), . . . , y(M−1) of M-DFT precoded 903 symbol 908 may be mapped to a physical resource 904, that is, time 906 and frequency 907 resources. First, M-DFT precoded 903 symbol sequences y(0), y(1), . . . , y(M−1) may correspond to one DFT-S-OFDM modulation symbol. An M-DFT precoded 903 symbol sequence corresponding to an l-th DFT-S-OFDM modulation symbol is indicated in $y_l$, that is, $y_l(0), y_l(1), \ldots, y_l(M-1)$. The M-DFT precoded 903 symbol sequence $y_l(0), y_l(1), \ldots, y_l(M-1)$ may be mapped in the time 906 and frequency 907 domains (mapped to the time and frequency domains of 905 in the example of FIG. 9) and transmitted.

Based on the above-described DFT-S-OFDM transmission scheme, in the following description, various embodiments of a resource allocation method and a method of indicating resource allocation information to a terminal are proposed.

Embodiment 1-1

For a data channel (e.g., PDSCH) modulated with DFT-S-OFDM and transmitted, the base station may notify resource allocation information on the PDSCH transmitted to the terminal using DCI, and fields corresponding to the following information may be included in the corresponding DCI.

Time domain resource allocation information: this may include information such as a start symbol and length of the PDSCH, a PDSCH mapping type (or DMRS transmission position), and slot timing of the PDSCH (e.g., PDCCH-to-PDSCH timing).

Frequency domain resource allocation information: this may correspond to frequency domain allocation information corresponding to the aforementioned resource allocation type 0 or resource allocation type 1. The terminal may implicitly know the size M of the DFT precoder from the notified frequency domain resource allocation information. For example, when the terminal has been allocated total $N_{RB}$ as the frequency domain resource allocation information, the terminal may assume that the size of the DFT precoder is $M=N_{RB}N^{sc}_{RB}$. Here, $N^{sc}_{RB}$ may be defined as the number of subcarriers per RB.

Virtual domain resource allocation information: this may correspond to a field indicating resource allocation information in a virtual domain resource. The terminal may regard the size M of the DFT precoder learned from the frequency domain resource allocation information as the entire virtual domain resource allocation region. The following two types may be considered as a method of indicating virtual domain resource allocation information.

Resource allocation type A: virtual domain resource allocation information may be notified to the terminal in a bitmap method. In this case, the virtual domain allocation unit indicated by the bitmap may be a VRE, a VRE group (VREG), a virtual RB (VRB), or a VRB group (VRBG). The VREG may correspond to a unit configured with one or a plurality of VREs, the VRB may correspond to a unit configured with a plurality of VREs, and the VRBG may correspond to a unit configured with one or a plurality of VRBs. The above-described virtual domain resource allocation unit is collectively referred to as a virtual resource group (VRG). Data may be allocated to the virtual domain in units of VRG. The VRG size (P) may be determined by a combination of the size (or the same DFT size M) of the virtual domain resource region to which data is allocated and a configuration value configured by higher layer signaling (e.g., RRC signaling). When the size of the virtual domain resource is $M_{VREs}$ (may be defined as the total number of VREs or the number of VRGs), the number of RBGs in the virtual domain resource bandwidth part, $N_{VRG}$ may be determined as follows.

$$N_{VRG}=\lceil (M_{VREs}+(M_{VREs} \bmod P))/P \rceil, \text{ where}$$

the size of the first VRG is $VRG_0^{size}=P-M_{VREs} \bmod P$,
the size of last VRG is $VRG_{last}^{size}=(M_{VREs}^{start}+M_{VREs}^{size}) \bmod P$ if $(M_{VREs}^{start}+M_{VREs}^{size}) \bmod P > 0$ and P otherwise,
the size of all other VRGs is P.

The terminal may receive a notification of virtual domain resource allocation information from the base station through one bit per VRG, that is, all $N_{VRG}$ bits.

Resource allocation type B: In the method of indicating virtual domain resource allocation information, information on the starting point of the VRE (or the defined VRG) to which data is mapped in the virtual domain resource region and the number of the continuously allocated VRE (or the defined VRG) may be notified to the terminal. More specifically, the virtual domain resource allocation field value may be configured with a virtual domain resource allocation indication value (RIV) corresponding to a starting point ($VRE_{start}$) of the VRE (or VRG) to which data is allocated and the number ($L_{VREs}$) of consecutive VREs (or VRG) to which data is allocated. The RIV may be defined as follows.

if $(L_{VREs} - 1) \leq \lfloor M_{VREs}/2 \rfloor$ then
  RIV = $M_{VREs}(L_{RBs} - 1) + VRE_{start}$
else
  RIV = $M_{VREs}(M_{VREs} - L_{VREs} + 1) + (M_{VREs} - 1 - VRE_{start})$
  where $L_{VREs} \geq 1$ and shall not exceed $M_{VREs} - VRE_{start}$ The size of the DCI field corresponding to virtual domain allocation may correspond to $\lceil \log_2(M_{VREs}(M_{VREs}+1)/2) \rceil$ bits.

The terminal may determine a resource region to which the PDSCH is mapped based on the received time domain resource allocation information, frequency domain resource allocation information, and virtual domain resource allocation information; thus, the terminal determine an amount of scheduled data, and a transport block size (TBS). By performing demodulation and modulation after receiving the PDSCH based on the aforementioned resource allocation information on the aforementioned PDSCH, the terminal may obtain data.

In a method for the base station to transmit the DFT-S-OFDM based PDSCH through the embodiment 1-1, as the base station instructs resource allocation information in a virtual domain to the terminal, before DFT precoding the PDSCH of multiple terminals, that is, the base station may multiplex and transmit the PDSCH in a virtual domain resource. The PDSCH multiplexed in the virtual domain resource region may be modulated into a signal having good signal characteristics (e.g., low peak-to-average power ratio (PAPR)) through DFT precoding. Accordingly, there is an advantage in that the PDSCH transmission coverage may be widened.

Embodiment 1-2

For a data channel (e.g., PDSCH) modulated with DFT-S-OFDM and transmitted, the base station may notify resource allocation information on the PDSCH transmitted to the terminal using DCI, and fields corresponding to the following information may be included in the corresponding DCI.

Time domain resource allocation information: this may include information such as a start symbol and length of the PDSCH, a PDSCH mapping type (or DMRS transmission position), and a slot timing of the PDSCH (e.g., PDCCH-to-PDSCH timing).

DFT size information: The terminal may explicitly receive a notification of the size M of the DFT precoder from the base station.

Virtual domain resource allocation information: this may correspond to a field indicating resource allocation information in a virtual domain resource. The terminal may regard the size M of the DFT precoder learned from the frequency domain resource allocation information as the entire virtual domain resource allocation region. Hereinafter, a method of indicating virtual domain resource allocation information may be the same as that described in the foregoing embodiment 1-1.

In performing the embodiment 1-2 of the disclosure, frequency domain resource allocation information on the PDSCH may be configured in advance by the base station to the terminal by higher layer signaling (e.g., MIB, SIB, RRC signaling, etc.). Alternatively, the frequency domain resource allocation information may be predefined as a specific value. For example, the PDSCH may be mapped to a center frequency with a bandwidth corresponding to the DFT size in the frequency domain, or the RB having the lowest index may be mapped to the starting point of the RB and transmitted. As another example, the PDSCH may be interleaved in the frequency domain and distributed to be transmitted. As another example, the PDSCH may be mapped and transmitted (frequency hopping) while a different start RB position or a center frequency position is changed according to a time in the frequency domain.

In a method for the base station to transmit the DFT-S-OFDM based PDSCH according to the embodiment 1-2, as the base station instructs resource allocation information in a virtual domain to the terminal, before DFT precoding PDSCHs of multiple terminals, that is, the PDSCHs may be multiplexed and transmitted in a virtual domain resource. In the method of instructing the resource allocation information to the terminal, the base station may greatly reduce the DCI size by omitting the instruction of the resource allocation information in the frequency domain using DCI. This has the advantage of securing wide transmission coverage for the PDCCH. However, by notifying the frequency domain allocation information on the PDSCH as fixed or minimized information, it is possible to minimize or not multiplex the PDSCHs of multiple terminals in the frequency domain. When the PDSCHs of multiple terminals are multiplexed in the frequency domain, the characteristics of the signal may be not good (e.g., it may have a high PAPR), and accordingly, because the PDSCH transmission coverage may be low, the base station may transmit the PDSCHs of multiple terminals at a specific time point without performing multiplexing in the frequency domain.

Embodiment 1-3

For a data channel (e.g., PDSCH) modulated with DFT-S-OFDM and transmitted, the base station may notify resource allocation information on the PDSCH transmitted to the terminal using DCI, and fields corresponding to the following information may be included in the corresponding DCI.

Time domain resource allocation information: this may include information such as a start symbol and length of the PDSCH, a PDSCH mapping type (or DMRS transmission position), and slot timing of the PDSCH (e.g., PDCCH-to-PDSCH timing).

Frequency domain resource allocation information: this may correspond to frequency domain allocation information corresponding to the aforementioned resource allocation type 0 or resource allocation type 1. The terminal may implicitly know the size M of the DFT precoder from the notified frequency domain resource allocation information. For example, when the terminal has been allocated the total $N_{RB}$ as the frequency domain resource allocation information, the terminal may assume that the size of the DFT precoder is $M=N_{RB}N^{sc}_{RB}$. Here, $N^{sc}_{RB}$ may be defined as the number of subcarriers per RB.

In performing the embodiment 1-3 of the disclosure, the terminal may assume that data in the virtual domain resource has been mapped in the entire virtual domain region. That is, the terminal may assume (i.e., $M_{sym}=M$) that a modulation symbol sequence length $M_{sym}$ before DFT precoding and the size M of DFT precoding are the same. This may mean that the base station maps and transmits the PDSCH of only one terminal in the virtual domain resource. That is, the base station may not multiplex PDSCHs of multiple terminals in the virtual domain resource region. The base station may multiplex the PDSCHs of multiple terminals in the physical resource region, that is, in the time or frequency domain.

Embodiment 1-4

The base station may notify the size M of the DFT precoder to the terminal using higher layer signaling (e.g.,
MIB, SIB, RRC, or MAC CE) or L1 signaling (e.g., DCI, group common DCI (GC-DCI), or common DCI). The terminal may determine the size of the frequency domain resource allocation field or the virtual domain resource allocation field described below based on the notified size M of the DFT precoder.

More specifically, for a data channel (e.g., PDSCH) modulated with DFT-S-OFDM and transmitted, the base station may notify resource allocation information on the PDSCH transmitted to the terminal using DCI, and fields corresponding to the following information may be included in the corresponding DCI.

Time domain resource allocation information; this may include information such as a start symbol and length of the PDSCH, a PDSCH mapping type (or DMRS transmission position), and slot timing of the PDSCH (e.g., PDCCH-to-PDSCH timing).

Frequency domain resource allocation information: this may correspond to frequency domain allocation information corresponding to the aforementioned resource allocation type 0 or resource allocation type 1. In this case, the terminal may assume that a frequency region in which the PDSCH may be scheduled is a region, that is, $N_{RB}^{DFT}=M/N_{RB}^{SC}$ corresponding to the DFT size previously notified from the base station. That is, the size of the frequency domain resource allocation information field may be determined based on $N_{RB}^{DFT}$ not the bandwidth $N_{RB}^{BWP}$ corresponding to the entire bandwidth part (may be equally applied by substituting $N_{RB}^{BWP}$ for $N_{RB}^{DFT}$ in the description of the above-described resource allocation type 0 or resource allocation type 1). Further, the terminal may interpret the frequency domain resource allocation information field based on $N_{RB}^{DFT}$.

Virtual domain resource allocation information: this may correspond to a field indicating resource allocation information in a virtual domain resource. The terminal may regard the size M of the DFT precoder previously notified from the base station as the entire virtual domain resource allocation region. Hereinafter, a method of indicating virtual domain resource allocation information may be the same as that described in the above embodiment 1-1.

Through the embodiment 1-4, the terminal may determine the size of DCI for scheduling the above-described PDSCH based on information on the size of the DFT notified in advance from the base station. From the DCI size configured or indicated as described above, the terminal may determine the size of the field corresponding to the frequency domain resource allocation information and the size of the field corresponding to the virtual domain resource allocation information.

The above-described first embodiment of the disclosure may be applied equally to the resource allocation method for a PUSCH.

Embodiment 2

In 5G, the base station may transmit various configuration information related to PDSCH transmission to the terminal through higher layer signaling (e.g., RRC).

The configuration information related to PDSCH transmission may include, for example, the following contents.

TABLE 15

Data scrambling ID
DMRS configuration information
Transmission Configuration Information (TCI) state information
Resource assignment related configuration information (resource assignment type, VRB-to-PRB interleaver, time domain resource assignment table, repetition number (Aggregation Factor)
Rate Matching resource pattern information
Resource Block Group (RGB) size TABLE 15-continued Modulation Coding Scheme (MCS) table
Physical Resource Block (PRB) bundling related configuration information
CSI-RS related configuration information More specifically, the following contents may be included.

| PDSCH-Config information element |
| --- |

```
-- ASN1START
-- TAG-PDSCH-CONFIG-START
PDSCH-Config ::=                    SEQUENCE {
    dataScramblingIdentityPDSCH              INTEGER (0..1023)
OPTIONAL, -- Need S
    dmrs-DownlinkForPDSCH-MappingTypeA            SetupRelease ( DMRS-DownlinkConfig )
OPTIONAL, -- Need M
    dmrs-DownlinkForPDSCH-MappingTypeB            SetupRelease ( DMRS-DownlinkConfig )
OPTIONAL, -- Need M
    tci-StatesToAddModList              SEQUENCE (SIZE(1..maxNrofTCI-States)) OF
TCI-State                 OPTIONAL, -- Need N
    tci-StatesToReleaseList              SEQUENCE (SIZE(1..maxNrofTCI-States)) OF
TCI-StateId               OPTIONAL, -- Need N
    vrb-ToPRB-Interleaver              ENUMERATED (n2, n4)
OPTIONAL, -- Need S
    resourceAllocation              ENUMERATED ( resource Allocationtype0,
resourceAllocationType1, dynamicSwitch),
    pdsch-TimeDomainAllocationList          SetupRelease
( PDSCH-TimeDomainResourceAllocationList )                OPTIONAL, -- Need M
    pdsch-AggregationFactor              ENUMERATED ( n2, n4, n8 )
OPTIONAL, -- Need S
    rateMatchPatternToAddModList            SEQUENCE (SIZE (1..maxNrofRateMatchPatterns))
OF RateMatchPattern         OPTIONAL, --Need N
    rateMatchPatternToReleaseList            SEQUENCE (SIZE (1..maxNrofRateMatchPatterns))
OF RateMatchPatternId       OPTIONAL, --Need N
    rateMatchPatternGroup1              RateMatchPatternGroup
OPTIONAL, -- Need P
    rateMatchPatternGroup2              RateMatchPatternGroup
OPTIONAL, -- Need R
    rbg-Size                ENUMERATED (config1, config2),
    mcs-Table                ENUMERATED (qam256, qam64LowSE)
OPTIONAL, -- Need S
    maxNrofCodeWordsScheduledByDCI            ENUMERATED (n1, n2)
OPTIONAL, -- Need R
prb-BundlingType            CHOICE {
    staticBundling              SEQUENCE {
        bundleSize              ENUMERATED ( n4, wideband )
OPTIONAL, -- Need S
    },
    dynamicBundling            SEQUENCE {
        bundlingSizeSet1              ENUMERATED ( n4, wideband, n2-wideband,
n4-wideband )       OPTIONAL, -- Need S
        bundleSizeSet2              ENUMERATED ( n4, wideband )
OPTIONAL, -- Need S
    }
},
    zp-CSI-RS-ResourceToAddModList            SEQUENCE (SIZE
(1..maxNrofZP-CSI-RS-Resources)) OF ZP-CSI-RS-Resource
OPTIONAL, -- Need N
    zp-CSI-RS-ResourceToReleaseList            SEQUENCE (SIZE
(1..maxNrofZP-CSI-RS-Resources)) OF ZP-CSI-RS-ResourceId
OPTIONAL, -- Need N
    aperiodic-ZP-CSI-RS-ResourceSetsToAddModList          SEQUENCE (SIZE
(1..maxNrofZP-CSI-RS-ResourceSets)) OF ZP-CSI-RS-ResourceSet
OPTIONAL, -- Need N
    aperiodic-ZP-CSI-RS-ResourceSetsToReleaseList          SEQUENCE (SIZE
(1..maxNrofZP-CSI-RS-ResourceSets)) OF ZP-CSI-RS-ResourceSetId
OPTIONAL, -- Need N
    sp-ZP-CSI-RS-ResourceSetsToAddModList          SEQUENCE (SIZE
(1..maxNrofZP-CSI-RS-ResourceSets)) OF ZP-CSI-RS-ResourceSet
OPTIONAL, -- Need N
```

| PDSCH-Config information element |
|---|
| sp-ZP-CSI-RS-ResourceSetsToReleaseList            SEQUENCE (SIZE (1..maxNrofZP-CSI-RS-ResourceSets)) OF ZP-CSI-RS-ResourceSetId OPTIONAL, -- Need N<br>  p-ZP-CSI-RS-ResourceSet                   SetupRelease ( ZP-CSI-RS-ResourceSet ) OPTIONAL, -- Need M<br>  ...<br>}<br>RateMatchPatternGroup ::=                SEQUENC {SIZE (1..maxNrofRateMatchPatternsPerGroup)) OF CHOICE {<br>  cellLevel                               RateMatchPatternId,<br>  BwpLevel                                RateMatchPatternID<br>}<br>-- TAG-PDSCH-CONFIG-STOP<br>-- ASN1STOP |

In a method for the base station to transmit the PDSCH to the terminal, the aforementioned DFT precoding may or may not be applied. A transmission method to which DFT precoding is applied is referred to as DFT-S-OFDM transmission, and a transmission method to which DFT precoding is not applied is referred to as CP-OFDM transmission.

When the terminal receives a DFT-S-OFDM-based PDSCH, the receiver may demodulate the PDSCH by applying inverse DFT precoding, and when the terminal receives a CP-OFDM-based PDSCH, the receiver may demodulate the PDSCH without applying inverse DFT precoding.

For convenience, a DFT-S-OFDM-based transmission mode is referred to as a "first transmission mode", and a CP-OFDM-based transmission mode is referred to as a "second transmission mode".

The base station may determine and notify the terminal whether to use the "first transmission mode" or the "second transmission mode" for the PDSCH, and the terminal may control an operation of the receiver based on the notified information. For example, the base station may set differently for all or part of the configuration information related to the above-described PDSCH with higher layer signaling (e.g., RRC signaling) for the first transmission mode and the second transmission mode.

For example, the following information may be set for the first transmission mode or the second transmission mode, respectively.

MCS table
    TCI state configuration information (e.g., configuration information related to Quasi Co-Located (QCL) for the transmitted PDSCH or information related to the reception beam (may be referred to as QCL type D))
    Resource allocation related configuration information
    PRB bundling related configuration information
    CSI-RS related configuration information For example, the base station may configure a PDSCH configuration #1 for the first transmission mode with higher layer signaling (e.g., RRC signaling) to the terminal, and configure a PDSCH configuration #2 for the second transmission mode.

The terminal may be notified from the base station of whether the terminal is in a first transmission mode or a second transmission mode through higher layer signaling (e.g., RRC). When the first transmission mode is configured, the terminal may receive the PDSCH based on configuration information based on the PDSCH configuration #1. When the second transmission mode is configured, the terminal may receive the PDSCH based on configuration information based on the PDSCH configuration #2.

Alternatively, the terminal may be notified from the base station of whether the terminal is in the first transmission mode or the second transmission mode through an MAC CE activation command. More specifically, the terminal may receive an MAC CE command for activating a specific transmission mode in a slot n, and assume (or apply) a transmission mode indicated by the MAC CE command from a slot n+k (k>0) to receive the PDSCH. When the transmission mode indicated by the MAC CE is the first transmission mode, the terminal may receive the PDSCH based on configuration information based on the PDSCH configuration #1. When the transmission mode indicated by the MAC CE is the second transmission mode, the terminal may receive the PDSCH based on configuration information based on the PDSCH configuration #2.

Alternatively, the terminal may be dynamically notified from the base station of whether the terminal is in the first transmission mode or the second transmission mode through L1 signaling (e.g., DCI). A transmission mode indicator field may be included in the DCI. The terminal may obtain DCI from the PDCCH transmitted in a slot n, and identify whether the PDSCH scheduled through the DCI corresponds to the first transmission mode or the second transmission mode through the transmission mode indicator field included in the DCI.

When the transmission mode indicated through DCI is a first transmission mode, the terminal may receive a PDSCH based on configuration information based on a PDSCH configuration #1. When the transmission mode indicated through DCI is a second transmission mode, the terminal may receive a PDSCH based on configuration information based on the PDSCH configuration #2. In this case, some of configuration information that may be set differently for each transmission mode may be information that should be known in advance before decoding of the PDCCH is finished. For example, TCI state configuration information, that is, configuration information related to a reception beam may be configured differently according to the first transmission mode or the second transmission mode. In this case, by assuming a specific TCI state for some time (defined as T) consumed for performing decoding on the PDCCH, the terminal may need to receive a symbol for the PDSCH. In order to solve this problem, for example, the following methods may be considered.

[Method 1]

In receiving the PDSCH during the aforementioned time T, the terminal may receive the PDSCH on the assumption that a TCI state is configured in a specific transmission mode. For example, the terminal may receive the PDSCH on the assumption that the TC state is configured to the first transmission mode (or the second transmission mode) for the time T, and receive the PDSCH on the assumption of the TCI state corresponding to the transmitted mode indicated by the DCI from a time point after obtaining the DCI after decoding of the PDCCH is finished.

[Method 2]

The terminal may not expect the PDSCH to be transmitted in the above-described T time domain. That is, the terminal may notify scheduling information so that a time domain resource allocation indicator for the PDSCH in the DCI field is always scheduled after the time T at a PDCCH reception time point. The terminal may receive the PDSCH based on a transmission mode obtained from the DCI from a time point when decoding of the PDCCH is completed.

As another example, the base station may configure independently for a first transmission mode and a second transmission mode, respectively for configuration information related to the above-described CSI measurement and reporting with higher layer signaling (e.g., RRC signaling). For example, the following information may be configured for the first transmission mode or the second transmission mode, respectively.

Configuration information related to CSI resources (information on CSI-RS resource set, synchronization signal block resource set, etc.). More specifically, it may correspond to the following information.

| CSI-ResourceConfig information element |
|---|
| -- ASN1START |
| -- TAG-CSI-RESOURCECONFIG-START |
| CSI-ResourceConfig ::=         SEQUENCE { |
|     csi-ResourceConfigId            CSI-ResourceConfigId, |
|     csi-RS-ResourceSetList          CHOICE { |
|         nzp-CSI-RS-SSB                  SEQUENCE { |
|             nzp-CSI-RS-ResourceSetList          SEQUENCE (SIZE (1..maxNrofNZP-CSI-RS-ResourceSetsPerConfig)) OF NZP-CSI-RS-ResourceSetId OPTIONAL, -- Need R |
|             csi-SSB-ResourceSetList             SEQUENCE (SIZE (1..maxNrofCSI-SSB-ResourceSetsPerConfig)) OF CSI-SSB-ResourceSetId OPTIONAL, -- Need R |
|         }, |
|         csi-IM-ResourceSetList          SEQUENCE (SIZE (1..maxNrofCSI-IM-ResourceSetsPerConfig)) OF CSI-IM-ResourceSetId |
|     }, |
|     bwp-Id                          BWP-Id, |
|     resourceType                    ENUMERATED { aperiodic, semiPersistent, periodic }, |
|     ... |
| } |
| -- TAG-CSI-RESOURCECONFIG-STOP |
| -- ASN1STOP |

Configuration information related to CSI reporting (configuration information related to transmission resources for CSI reporting, etc.). More specifically, it may correspond to the following information.

| CSI-ReportConfig information element |
|---|
| -- ASN1START |
| -- TAG-CSI-REPORTCONFIG-START |
| CSI-ReportConfig ::=        SEQUENCE { |
|     reportConfigId                  CSI-ReportConfigId, |
|     carrier                         ServCellIndex                   OPTIONAL, -- Need S |
|     resourcesForChannelMeasurement  CSI-ResourceConfigId, |
|     csi-IM-ResourcesForInterference CSI-ResourceConfigId            OPTIONAL, -- Need R |
|     nzp-CSI-RS-ResourcesForInterference CSI-ResourceConfigId        OPTIONAL, -- Need R |
|     reportConfigType                CHOICE { |
|         periodic                        SEQUENCE { |
|             reportSlotConfig                CSI-ReportPeriodicityAndOffset, |
|             pucch-CSI-ResourceList          SEQUENCE (SIZE (1..maxNrofBWPs)) OF PUCCH-CSI-Resource |
|         },| |
|         semiPersistentOnPUCCH           SEQUENCE { |
|             reportSlotConfig                CSI-ReportPeriodicityAndOffset, |
|             pucch-CSI-ResourceList          SEQUENCE (SIZE (1..maxNrofBWPs)) OF PUCCH-CSI-Resource |
|         }, |
|         semiPersistentOnPUSCH           SEQUENCE { |
|             reportSlotConfig                ENUMERATED (s15, s110, s120, s140, s180, s1160, s1320), |
|             reportSlotOffsetList            SEQUENCE (SIZE (1..maxNrofUL-Allocations)) OF INTEGER (0..32), |
|             p0alpha                         P0-PUSCH-AlphaSetId |
|         }, |
|         aperiodic                       SEQUENCE { |
|             reportSlotOffsetList            SEQUENCE (SIZE (1..maxNrofUL-Allocations)) OF INTEGER(0..32) |
|         } |
|     }, |

| CSI-ReportConfig information element |
| --- |
| ```
    reportQuantity                                  CHOICE {
        none                                            NULL,
        cri-RI-PMI-CQI                                  NULL,
        cri-RI-i1                                       NULL,
        cri-RI-i1-CQI                                   SEQUENCE {
            pdsch-BundleSizeForCSI                          ENUMERATED (n2, n4)
OPTIONAL -- NEED S
        },
        cri-RI-CQI                                      NULL,
        cri-RSRP                                        NULL,
        ssb-Index-RSRP                                  NULL,
        cri-RI-LI-PMI-CQI                               NULL
    },
    reportFreqConfiguration                         SEQUENCE {
        cqi-FormatIndicator                             ENUMERATED ( widebandCQI, subbandCQI )
OPTIONAL, -- Need R
        pmi-FormatIndicator                             ENUMERATED ( widebandPMI, subbandPMI )
OPTIONAL, -- Need R
        csi-ReportingBand                               CHOICE {
            subbands3                                       BIT STRING(SIZE(3)),
            subbands4                                       BIT STRING(SIZE(4)),
            subbands5                                       BIT STRING(SIZE(5)),
            subbands6                                       BIT STRING(SIZE(6)),
            subbands7                                       BIT STRING(SIZE(7)),
            subbands8                                       BIT STRING(SIZE(8)),
            subbands9                                       BIT STRING(SIZE(9)),
            subbands10                                      BIT STRING(SIZE(10)),
            subbands11                                      BIT STRING(SIZE(11)),
            subbands12                                      BIT STRING(SIZE(12)),
            subbands13                                      BIT STRING(SIZE(13)),
            subbands14                                      BIT STRING(SIZE(14)),
            subbands15                                      BIT STRING(SIZE(15)),
            subbands16                                      BIT STRING(SIZE(16)),
            subbands17                                      BIT STRING(SIZE(17)),
            subbands18                                      BIT STRING(SIZE(18)),
            ...,
            subbands19-v1530                                BIT STRING(SIZE(19))
        } OPTIONAL -- Need S
    }
OPTIONAL, -- Need R
    timeRestrictionForChannelMeasurements           ENUMERATED(configured, notConfigured),
    timeRestrictionForInterferenceMeasurements      ENUMERATED (configured,
notConfigured),
    codebookConfig                                  CodebookConfig
OPTIONAL, -- Need R
    dummy                                           ENUMERATED (n1, n2)
OPTIONAL, -- Need R
    groupBasedBeamReporting                         CHOICE {
        enabled                                         NULL,
        disabled                                        SEQUENCE {
            nrofReportedRS                                  ENUMERATED (n1, n2, n3, n4)
OPTIONAL -- Need S
        }
    },
    cqi-Table                           ENUMERATED (table1, table2, table3, spare1)
OPTIONAL, -- Need R
    subbandSize                         ENUMERATED (value1, value2),
    non-PMI-PortIndication              SEQUENCE (SIZE
(1..maxNrofNZP-CSI-RS-ResourcesPerConfig)) OF PortIndexFor8Ranks OPTIONAL, -- Need R
    ...,
    [[
    semiPersistentOnPUSCH-v1530                     SEQUENCE {
        reportSlotConfig-v1530                          ENUMERATED (s14, s18, s116)
    }
OPTIONAL -- Need P
    ]]
}
CSI-ReportPeriodicityAndOffset ::=      CHOICE {
    slots4                                  INTEGER (0..3),
    slots5                                  INTEGER (0..4),
    slots8                                  INTEGER (0..7),
    slots10                                 INTEGER (0..9),
    slots16                                 INTEGER (0..15),
    slots20                                 INTEGER (0..19),
    slots40                                 INTEGER (0..39),
    slots80                                 INTEGER (0..79),
    slots160                                INTEGER (0..159),
``` |

| CSI-ReportConfig information element |  |
|---|---|
| slots320 | INTEGER (0..319) |
| } |  |
| PUCCH-CSI-Resource ::= | SEQUENCE { |
|     uplinkBandwidthPartId |     BWP-Id, |
|     pucch-Resource |     PUCCH-ResourceId |
| } |  |
| PortIndexFor8Ranks ::= | CHOICE { |
|   portIndex8 |     SEQUENCE { |
|     rank1-8 |       PortIndex8 |
| OPTIONAL, -- Need R |  |
|     rank2-8 |       SEQUENCE(SIZE(2)) of PortIndex8 |
| OPTIONAL, -- Need R |  |
|     rank3-8 |       SEQUENCE(SIZE(3)) of PortIndex8 |
| OPTIONAL, -- Need R |  |
|     rank4-8 |       SEQUENCE(SIZE(4)) of PortIndex8 |
| OPTIONAL, -- Need R |  |
|     rank5-8 |       SEQUENCE(SIZE(5)) of PortIndex8 |
| OPTIONAL, -- Need R |  |
|     rank6-8 |       SEQUENCE(SIZE(6)) of PortIndex8 |
| OPTIONAL, -- Need R |  |
|     rank7-8 |       SEQUENCE(SIZE(7)) of PortIndex8 |
| OPTIONAL, -- Need R |  |
|     rank8-8 |       SEQUENCE(SIZE(8)) of PortIndex8 |
| OPTIONAL -- Need R |  |
|   }, |  |
|   portIndex4 |     SEQUENCE { |
|     rank1-4 |       PortIndex4 |
| OPTIONAL, -- Need R |  |
|     rank2-4 |       SEQUENCE(SIZE2)) OF PortIndex4 |
| OPTIONAL, -- Need R |  |
|     rank3-4 |       SEQUENCE(SIZE3)) OF PortIndex4 |
| OPTIONAL, -- Need R |  |
|     rank4-4 |       SEQUENCE(SIZE4)) OF PortIndex4 |
| OPTIONAL, -- Need R |  |
|   }, |  |
|   portIndex2 |     SEQUENCE { |
|     rank1-2 |       PortIndex2 |
| OPTIONAL, -- Need R |  |
|     rank2-2 |       SEQUENCE(SIZE(2)) OF PortIndex2 |
| OPTIONAL, -- Need R |  |
|   }, |  |
|   portIndex1 |     NULL |
| } |  |
| PortIndex8::= | INTEGER (0..7) |
| PortIndex4::= | INTEGER (0..3) |
| PortIndex2::= | INTEGER (0..1) |
| -- TAG-CSI-REPORTCONFIG-STOP |  |
| -- ASN1STOP |  |

For example, the base station may configure a CSI resource configuration #1 and a CSI reporting configuration #1 for the first transmission mode with higher layer signaling (e.g., RRC signaling) to the terminal, and configure a CSI resource configuration #2 and a CSI reporting configuration #2 for the second transmission mode.

The terminal may be notified from the base station of whether the terminal is in a first transmission mode or a second transmission mode with higher layer signaling (e.g., RRC, MAC CE signaling) or L1 signaling (e.g., DCI).

When the first transmission mode is configured, the terminal may perform measurement and reporting operations for CSI based on configuration information based on the CSI resource configuration #1 and the CSI reporting configuration #1. When the second transmission mode is configured, the terminal may perform measurement and reporting operations for CSI based on configuration information based on a CSI resource configuration #2 and a CSI reporting configuration #2.

Alternatively, the terminal may always perform CSI measurement and reporting for the first transmission mode (based on the CSI resource configuration #1 and the CSI report configuration #1) and CSI measurement and reporting for the second transmission mode (based on the CSI resource configuration #1 and the CSI reporting configuration #1) regardless of the transmission mode. The base station may differently control the transmission mode of the terminal based on the CSI information received from the terminal.

Figure 10:
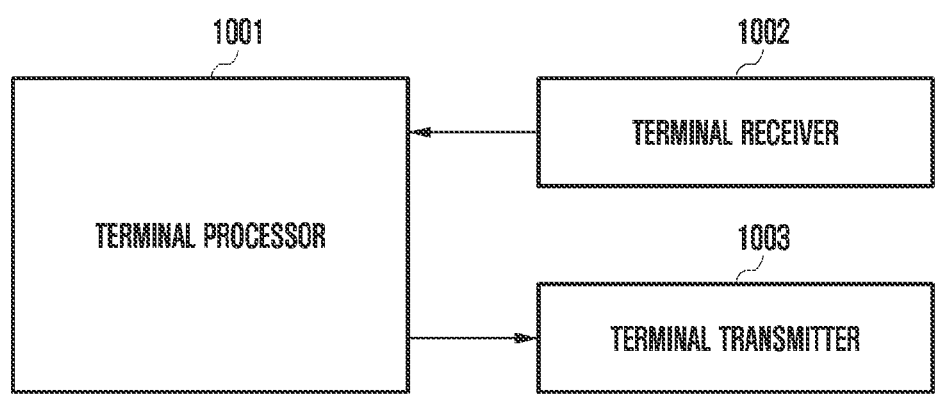
FIG. 10 is a block diagram illustrating a structure of a terminal according to an embodiment.
Figure 11:
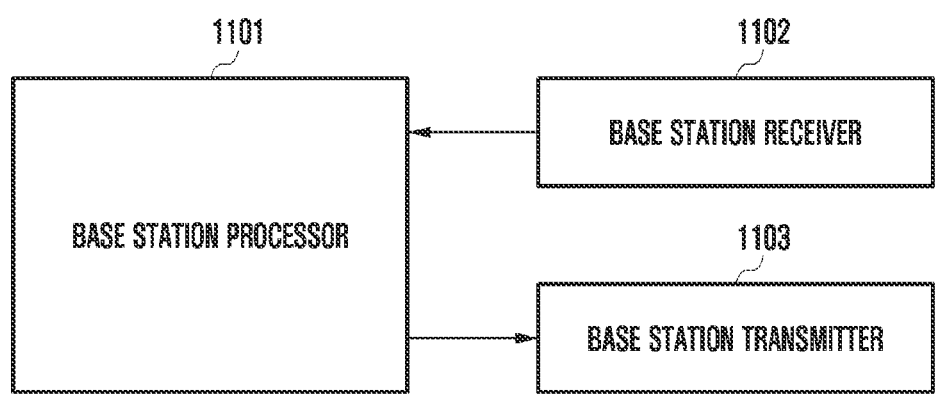
FIG. 11 is a block diagram illustrating a structure of a base station according to an embodiment.

In order to perform the above embodiments of the disclosure, transmitters, receivers, and controllers of the terminal and the base station are illustrated in FIGS. 10 and 11, respectively. A resource allocation method for a DFT-S-OFDM-based data channel corresponding to the above embodiment and a transmission and reception method between the base station and the terminal for applying a signaling method thereto are illustrated, and in order to perform this, the transmitters, the receivers, and the processors of the base station and the terminal should each operate according to the embodiment.

Specifically, FIG. 10 is a block diagram illustrating an internal structure of a terminal according to an embodiment of the disclosure.

As illustrated in FIG. 10, the terminal of the disclosure may include a terminal processor 1001, receiver 1002, and transmitter 1003.

The terminal processor 1001 may control a series of processes in which the terminal may operate according to the above-described embodiment of the disclosure. For example, a method of determining resource allocation for a DFT-S-OFDM-based data channel of the terminal according to an embodiment of the disclosure, a method of analyzing a DCI field and determining a size thereof, and a decoding operation for a data channel may be controlled differently. The terminal receiver 1002 and the terminal transmitter 1003 may be collectively referred to as a transceiver in the embodiment of the disclosure. The transceiver may transmit and receive signals to and from the base station. The signal may include control information and data. To this end, the transceiver may include an RF transmitter that up-converts and amplifies a frequency of a transmitted signal, and an RF receiver that amplifies a received signal with low noise and down-converts a frequency thereof. Further, the transceiver may receive a signal through a wireless channel, output the signal to the terminal processor 1001, and transmit a signal output from the terminal processor 1001 through a wireless channel.

FIG. 11 is a block diagram illustrating an internal structure of a base station according to an embodiment of the disclosure.

As illustrated in FIG. 11, the base station of the disclosure may include a base station processor 1101, receiver 1102, and transmitter 1103.

The base station processor 1101 may control a series of processes so that the base station may operate according to the above-described embodiment of the disclosure. For example, a resource allocation method for a DFT-S-OFDM-based data channel and a signaling method therefor according to an embodiment of the disclosure may be controlled differently. The base station receiver 1102 and the base station transmitter 1103 may be collectively referred to as a transceiver in the embodiment of the disclosure. The transceiver may transmit and receive signals to and from the terminal. The signal may include control information and data. To this end, the transceiver may include an RF transmitter that up-converts and amplifies a frequency of a transmitted signal, and an RF receiver that amplifies a received signal with low noise and down-converts a frequency thereof. Further, the transceiver may receive a signal through a radio channel, output the signal to the base station processor 1101, and transmit the signal output from the base station processor 1101 through the radio channel.

In a wireless communication system according to the disclosure, a base station includes a transceiver; and a controller for transmitting downlink control information including resource allocation information on a physical downlink shared channel (PDSCH) and resource allocation information on a virtual domain to the terminal, multiplexing the PDSCH in a virtual domain resource based on the resource allocation information on the virtual domain, and performing discrete Fourier transform (DFT) precoding on the multiplexed PDSCH.

Further, in the wireless communication system according to the disclosure, the terminal includes a transceiver; and a controller for receiving downlink control information including resource allocation information on a physical downlink shared channel (PDSCH) and resource allocation information on a virtual domain from a base station, identifying a virtual domain resource based on the resource allocation information on the virtual domain, and receiving a physical downlink shared channel (PDSCH) multiplexed in the virtual domain resource.

In the drawings for describing the method of the disclosure, the order of description does not necessarily correspond to the order of execution, and the preceding and following relationships may be changed or may be executed in parallel.

Alternatively, in the drawings illustrating the method of the disclosure, some of the components may be omitted and only some of the components may be included within a range that does not impair the essence of the disclosure.

Further, the method of the disclosure may be implemented by combining some or all of the contents included in each embodiment within a range that does not impair the essence of the disclosure.

The embodiments of the disclosure disclosed in this specification and drawings only present a specific example in order to describe the technical contents of the disclosure easily and to aid understanding of the disclosure, and are not intend to limit the scope of the disclosure. That is, it is apparent to those of ordinary skill in the art that other modifications based on the technical idea of the disclosure can be implemented. Further, the each embodiment may be operated with combined, as needed.

The invention claimed is:

1. A base station in a wireless communication system, the base station comprising:
   a transceiver; and
   a controller coupled with the transceiver and configured to:
      transmit, to a terminal, downlink control information including resource allocation information on a physical downlink shared channel (PDSCH) and resource allocation information on a virtual domain,
      based on the resource allocation information on the virtual domain, allocate symbols associated with the PDSCH to at least one virtual resource group (VRG) in a virtual domain resource,
      perform discrete Fourier transform (DFT) precoding on the allocated at least one VRG, and
      based on a result of the DFT precoding, transmit, to the terminal, the PDSCH.

2. The base station of claim 1, wherein the resource allocation information on the virtual domain includes bitmap information indicating a resource configured in a VRG unit, and
   wherein the VRG unit includes at least one of a virtual resource element (VRE), a virtual resource element group (VREG), a virtual resource block (VRB), or a virtual resource block group (VRBG).

3. The base station of claim 1, wherein a size of a VRG is determined based on a size of a resource region of the virtual domain and a configuration value received through higher layer signaling, and
   wherein the size of the resource region of the virtual domain is regarded as a size of a DFT precoder.

4. The base station of claim 1, wherein the resource allocation information on the virtual domain includes information indicating a starting point of a VRG and a number of consecutively allocated VRGs.

5. A method of a base station in a wireless communication system, the method comprising:
   transmitting, to a terminal, downlink control information including resource allocation information on a physical downlink shared channel (PDSCH) and resource allocation information on a virtual domain;

based on the resource allocation information on the virtual domain, allocating symbols associated with the PDSCH in a virtual domain resource;

performing discrete Fourier transform (DFT) precoding on the allocated at least one VRG; and based on a result of the DFT precoding, transmitting, to the terminal, the PDSCH.

6. The method of claim 5, wherein the resource allocation information on the virtual domain includes bitmap information indicating a resource configured in a VRG unit, and wherein the VRG unit includes at least one of a virtual resource element (VRE), a virtual resource element group (VREG), a virtual resource block (VRB), or a virtual resource block group (VRBG).

7. The method of claim 5, wherein a size of a VRG is determined based on a size of a resource region of the virtual domain and a configuration value received through higher layer signaling, and wherein the size of the resource region of the virtual domain is regarded as a size of a DFT precoder.

8. The method of claim 5, wherein the resource allocation information on the virtual domain includes information indicating a starting point of a VRG and a number of consecutively allocated VRGs.

9. A terminal in a wireless communication system, the terminal comprising:

a transceiver; and a controller coupled with the transceiver and configured to:

receive, from a base station, downlink control information including resource allocation information on a physical downlink shared channel (PDSCH) and resource allocation information on a virtual domain, identify a virtual domain resource based on the resource allocation information on the virtual domain, based on the downlink control information, receive, from the base station, the PDSCH associated with a virtual domain resource, and perform inverse discrete Fourier transform (DFT) precoding on the PDSCH.

10. The terminal of claim 9, wherein the resource allocation information on the virtual domain includes bitmap information indicating a resource configured in a virtual resource group (VRG) unit, and wherein the VRG unit includes at least one of a virtual resource element (VRE), a virtual resource element group (VREG), a virtual resource block (VRB), or a virtual resource block group (VRBG).

11. The terminal of claim 9, wherein a size of a virtual resource group (VRG) is determined based on a size of a resource region of the virtual domain and a configuration value received through higher layer signaling, and wherein the size of the resource region of the virtual domain is regarded as a size of a DFT precoder.

12. The terminal of claim 9, wherein the resource allocation information on the virtual domain includes information indicating a starting point of a virtual resource group (VRG) and a number of consecutively allocated VRGs.

13. A method of a terminal in a wireless communication system, the method comprising:

receiving, from a base station, downlink control information including resource allocation information on a physical downlink shared channel (PDSCH) and resource allocation information on a virtual domain;

identifying a virtual domain resource based on resource allocation information on the virtual domain;

based on the downlink control information, receiving, from the base station, the PDSCH associated with a virtual domain resource; and performing inverse discrete Fourier transform (DFT) precoding on the PDSCH.

14. The method of claim 13, wherein the resource allocation information on the virtual domain includes bitmap information indicating a resource configured in a virtual resource group (VRG) unit, wherein the VRG unit includes at least one of a virtual resource element (VRE), a virtual resource element group (VREG), a virtual resource block (VRB), or a virtual resource block group (VRBG), wherein a size of a VRG is determined based on a size of a resource region of the virtual domain and a configuration value received through higher layer signaling, and wherein the size of the resource region of the virtual domain is regarded as a size of a DFT precoder.

15. The method of claim 13, wherein the resource allocation information on the virtual domain includes information indicating a starting point of a virtual resource group (VRG) and a number of consecutively allocated VRGs.

* * * * *